US011354341B2

(12) United States Patent
Schwartz et al.

(10) Patent No.: US 11,354,341 B2
(45) Date of Patent: Jun. 7, 2022

(54) SYSTEM AND METHOD FOR TRANSLATING A SOFTWARE QUERY IN AN AUTOMATED INTEGRATION PROCESS INTO NATURAL LANGUAGE

(71) Applicant: Dell Products, LP, Round Rock, TX (US)

(72) Inventors: Daniel Schwartz, Marlton, NJ (US); Michael J. Morton, Morrisville, NC (US)

(73) Assignee: Boomi, LP, Chesterbrook, PA (US)

( * ) Notice: Subject to any disclaimer, the term of this patent is extended or adjusted under 35 U.S.C. 154(b) by 314 days.

(21) Appl. No.: 16/778,998

(22) Filed: Jan. 31, 2020

(65) Prior Publication Data

US 2021/0240750 A1    Aug. 5, 2021

(51) Int. Cl.
| | | |
|---|---|---|
| *G06F 16/30* | (2019.01) | |
| *G06F 16/332* | (2019.01) | |
| *G06F 40/205* | (2020.01) | |
| *G06F 16/182* | (2019.01) | |
| *G06F 16/16* | (2019.01) | |
| G06F 16/00 | (2019.01) | |

(52) U.S. Cl.
CPC ........ *G06F 16/3329* (2019.01); *G06F 16/168* (2019.01); *G06F 16/182* (2019.01); *G06F 16/3322* (2019.01); *G06F 40/205* (2020.01)

(58) Field of Classification Search
None
See application file for complete search history.

(56) References Cited

U.S. PATENT DOCUMENTS 8,082,144 B1 * 12/2011 Brown ................. G06Q 20/207
704/9
8,886,518 B1 * 11/2014 Wang ...................... G06F 40/44
704/9

(Continued)

FOREIGN PATENT DOCUMENTS

EP    3079372    * 12/2016    ............ H04N 21/41

OTHER PUBLICATIONS

Maryam Nafari and Chris Weaver "Query2Question: Translating Visualization Interaction into Natural Language", Jun. 2015, IEEE Transactions on Visualization and Computer Graphics (Year: 2015).*

*Primary Examiner* — Polina G Peach
(74) *Attorney, Agent, or Firm* — Prol Intellectual Property Law, PLLC; H. Kenneth Prol

(57) ABSTRACT

A method of translating software queries into natural language may comprise receiving a user instruction to identify a data set through a database query defined by a received user-selected query object and user-selected query value in setting a portion of a currently modeled integration process, and to perform a user-selected action on the data set, and translating a suggested database query associated in memory with the user-selected query object to a natural language translation. The method may also comprise displaying the natural language translation of the suggested database query, receiving a user instruction to include the suggested database query in the currently modeled integration process, and automatically generating and transmitting to a remote location for later execution, code instructions for performing the user-selected action on data sets stored at the remote database meeting the selected, suggested database query.

20 Claims, 15 Drawing Sheets

(56) References Cited

U.S. PATENT DOCUMENTS

| | | | |
|---|---|---|---|
| 9,734,839 B1* | 8/2017 | Adams | G06F 40/20 |
| 10,235,353 B1* | 3/2019 | Sanders | G06F 40/211 |
| 10,540,452 B1* | 1/2020 | Andrews | G06F 16/173 |
| 10,956,186 B1* | 3/2021 | Zammit | G06F 40/58 |
| 2014/0163952 A1* | 6/2014 | Brawer | G06F 40/129 |
| | | | 704/5 |
| 2014/0200878 A1* | 7/2014 | Mylonakis | G06F 40/51 |
| | | | 704/4 |
| 2015/0261880 A1* | 9/2015 | Luo | H04L 67/02 |
| | | | 707/736 |
| 2016/0170973 A1* | 6/2016 | Zhang | G06Q 50/01 |
| | | | 704/3 |
| 2016/0179481 A1* | 6/2016 | Ohara | G06F 16/252 |
| | | | 717/109 |
| 2017/0212872 A1* | 7/2017 | Albert | G07C 13/00 |
| 2018/0143978 A1* | 5/2018 | Chang | B60N 2/2806 |
| 2021/0064666 A1* | 3/2021 | Wang | G06N 5/04 |
| 2021/0240750 A1* | 8/2021 | Schwartz | G06F 40/56 |

* cited by examiner

SYSTEM AND METHOD FOR TRANSLATING A SOFTWARE QUERY IN AN AUTOMATED INTEGRATION PROCESS INTO NATURAL LANGUAGE

FIELD OF THE DISCLOSURE

The present disclosure relates generally to a system and method for deploying and executing customized data integration processes. More specifically, the present disclosure relates to translating previously executed software or database queries into natural language for user selection to include within a current search query.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

Figure 1:
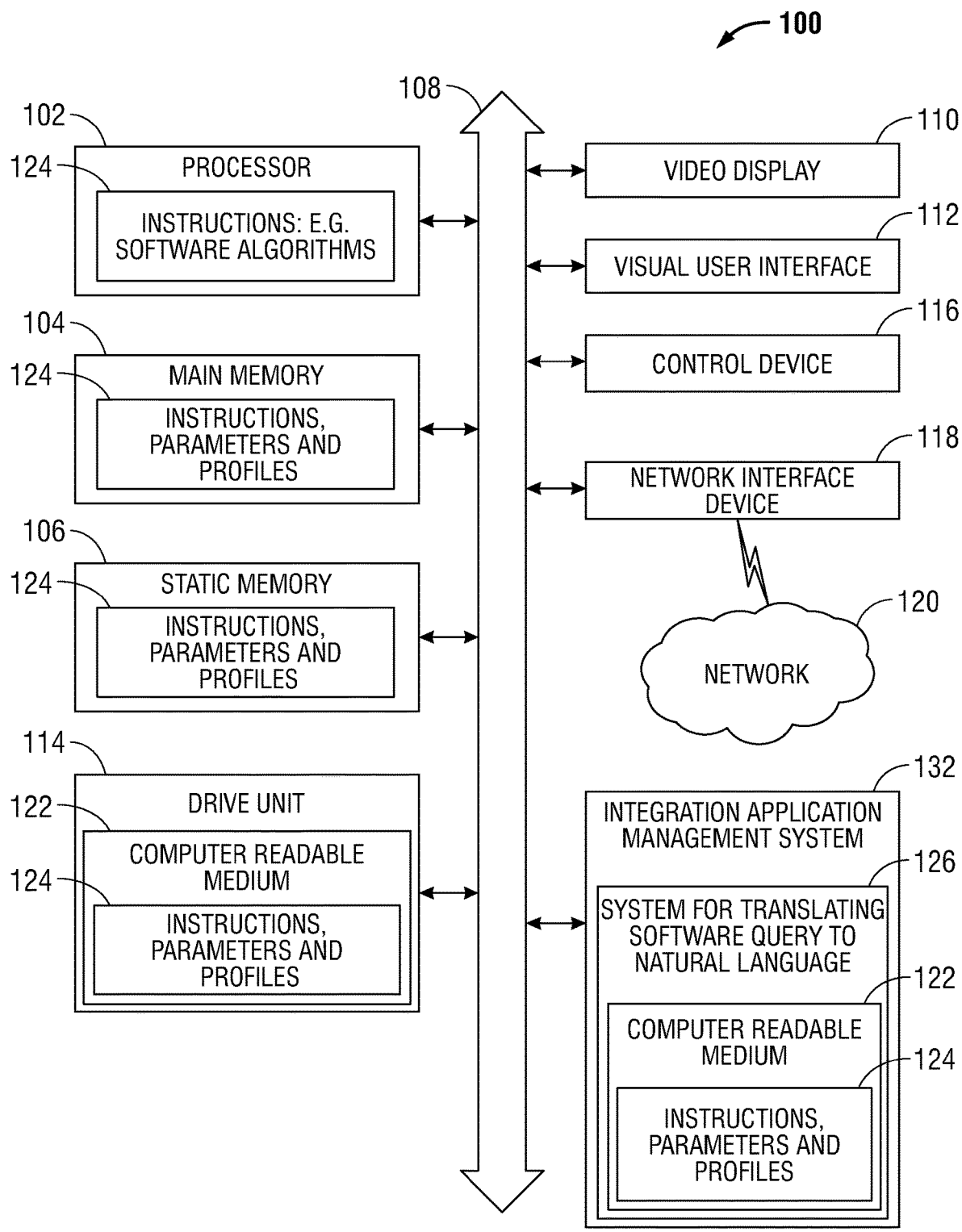
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Conventional software development and distribution models have involved development of an executable software application, and distribution of a computer-readable medium, or distribution via download of the application from the worldwide web to an end user. Upon receipt of the downloaded application, the end user executes installation files to install the executable software application on the user's personal computer (PC), or other information handling system. When the software is initially executed, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might sometimes be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. In many instances, these disparate computing networks, enterprises, or systems are located in a variety of different countries around the world. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's purchase order processing system. There is also a significant need to communicate between different software applications/systems within different computing networks, e.g. between a buyer's purchase order processing system, and a seller's invoicing system. Some of these different software applications/systems may be cloud-based, with physical servers located in several different countries, cities, or other geographical locations around the world. As data is integrated between and among these cloud-based platforms, data sets may be stored (e.g., temporarily or indefinitely) in some form at physical servers in these various geographical locations.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are available in the market today. These applications are typically purchased from software vendors and installed on a computerized system owned and maintained by the business, in this example, the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems in identical, generic form. The software application is then installed within a specific enterprise's computing network (which may include data centers, etc., physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart, and how that data should be communicated with Walmart®. A supplier/enterprise is then responsible for finding a generic, commercially available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

Recently, systems and software applications have been established to provide a system and method for on-demand creation of customized software applications in which the customization occurs outside of an enterprise's computing network. These software applications are customized for a specific enterprise before they arrive within the enterprise's computing network, and are delivered to the destination network in customized form. The Dell Boomi® Application is an example of one such software application. With Dell Boomi® and other similar applications, an employee within an enterprise can connect to a website using a specially configured graphical user interface to visually model a business integration process via a flowcharting process, using only a web browser interface. During such a modeling process, the user would select from a predetermined set of process-representing visual elements that are stored on a remote server, such as the web server. By way of an example, the integration process could enable a bi-directional exchange of data between internal applications of an enterprise, between internal enterprise applications and external trading partners, or between internal enterprise applications and applications running external to the enterprise.

A customized data integration software application creation system in an embodiment may allow a user to create a customized data integration software application by modeling a data integration process flow using a visual user interface. A modeled data integration process flow in embodiments of the present disclosure may model actions taken on data elements pursuant to executable code instructions without displaying the code instructions themselves. In such a way, the visual user interface may allow a user to understand the high-level summary of what executable code instructions achieve, without having to read or understand the code instructions themselves. Similarly, by allowing a user to insert visual elements representing portions of an integration process into the modeled data integration process flow displayed on the visual user interface, embodiments of the present disclosure allow a user to identify what she wants executable code instructions to achieve without having to write such executable code instructions.

Once a user has chosen what she wants an executable code instruction to achieve in embodiments herein, the code instructions capable of achieving such a task may be generated. Code instructions for achieving a task can be written in any number of languages and/or adhere to any number of standards, often requiring a code writer to have extensive knowledge of computer science and languages. The advent of open-standard formats for writing code instructions that are both human-readable and machine executable have made the writing of code instructions accessible to individuals that do not have a high level knowledge of computer science. Such open-standard, human-readable, data structure formats include extensible markup language (XML) and JavaScript Object Notification (JSON). Because code instructions adhering to these open-standard formats are more easily understood by non-specialists, many companies have moved to the use of code instructions adhering to these formats in constructing their data repository structures and controlling the ways in which data in these repositories may be accessed by both internal and external agents. In order to execute code instructions for accessing data at such a repository during a business integration process, the code instructions of the business integration process in some embodiments herein may be written in accordance with the same open-standard formats or other known, or later-developed standard formats.

In addition to the advent of open-standard, human-readable, machine-executable code instructions, the advent of application programming interfaces (APIs) designed using such open-standard code instructions or proprietary schemas have also streamlined the methods of communication between various software components. An API may operate to communicate with a backend application to identify an action to be taken on a data set that the backend application manages, or which is being transmitted for management to the backend application. Such an action and convention for identifying the data set or its location may vary among APIs and their backend applications. For example, data sets may be modeled according to user-supplied or proprietary definitions. Each data set may contain a user-defined or proprietary data set field name, which may describe a type of information. Each user-defined or proprietary data set field name may be associated with a data set field value. In other words, data sets may be modeled using a fieldname:value pairing. For example, a given API data set model for a customer named John Smith may include a first data set field name "f name" paired with a first data set field value "John," and a second data set field name "l name" paired with a second data set field value "Smith." A user or an API in an embodiment may define any number of such data set field name/value pairs to describe data sets. Other example data set field names in embodiments may include "dob" to describe date of birth, "ssn" to describe social security number, "phone" to describe a phone number, or "hair," "race," and "reward."

In embodiments described herein, multiple APIs, databases, or backend applications accessed via a single integration process may operate according to differing coding languages, data set structures, data set field naming conventions or standards. Different coding languages may use different ways of describing routines, data structures, object classes, variables, or remote calls that may be invoked and/or handled during business integration processes that involve data set field values managed by databases or by the backend applications such APIs serve. For example, in comparison to the API referenced directly above storing a fieldname/value of "f name"/"John," a data set for the same customer in a separate API may use a first data set field name "FirstName." Thus, a single data set field value (e.g., "John") may be described in a single integration process using a plurality of data set field names (e.g., "f name" or "FirstName"), each adhering to the naming conventions set by databases, the APIs, applications, enterprises, or trading partners through or among which the data set field value is programmed to integrate.

A user interacting with such a database, or an API for a backend application may identify such data set field values based on a description that may or may not include the actual data set field name of the data set field value. In some circumstances, a data set field value may be identified through a search or query mechanism, or through navigation through a variety of menus, for example. For example, a user in an embodiment may execute a direct query of a database or an application to identify one or more data sets managed by the database or application. In such an embodiment, the query executed by the user may adhere to specific syntax requirements set by the database or application. For example, some databases or backend applications may not be accessible via an API, and may only execute queries in the SQL query language. As another example, some databases or APIs may only execute queries adhering to the syntax requirements of JSON or XML, coding languages, which do not match SQL query language syntax. These are only a few examples of differing language syntaxes that could be used across multiple databases, applications or APIs to identify a given data set field name/value pair. In order for a user to effectively perform a query of two different databases, applications, or APIs using differing syntaxes, the user may be required to learn the proper syntax for each of these databases, applications or APIs. A solution is needed that allows a user to perform a query without having to learn the underlying syntax of the query language for each API or application.

The system for translating a software query to natural language described in embodiments herein addresses this issue by allowing users to select commonly used queries, written in natural language, which the system may then translate to the proper query syntax for later execution of an integration process. A user in embodiments described herein may provide a user-specified query object via a graphical user interface to initiate a query of a database, application or an API for data set field names described by the user-specified query object. For example, the graphical user interface in embodiments may receive a user input identifying a user-specified query object "Contact" as part of a query for data set field names that involve the word "Contact." The graphical user interface in embodiments described herein may then display one or more previously executed, suggested software queries that involved the same user-identified query object "Contact." Each of the suggested, previously executed software queries may be written in a natural language, easily understood by a user not familiar with specific software queries syntaxes. The user may then select one or more natural language sentences or clauses that best represent the search the user wishes to perform in a current or later execution of a software query.

Each of the user-selected natural language sentences or clauses in embodiments described herein may be associated in memory with a previously executed software query, written in the syntax required by the database, application or API managing the data upon which the previously executed software query was performed. This association may be the result of a parsing method employed by the system for translating a software query to natural language as the system translates previously executed software queries into natural language for selection by a user. The system for translating a software query to natural language in embodiments described herein may receive such a previously executed software query adhering to the syntax requirements of a given database, API, or application, and parse the query into phrases to separate concatenated query objects from concatenated query operators. For example, the system for translating a software query to natural language may parse a suggested database query "Contact/addressee doesNotStartWith?" into a concatenated query object "Contact/addressee" and a concatenated query operator "doesNotStartWith."

The parsed phrase may then be further parsed into a parsed clause to separate the concatenated query object into separate, parsed query objects, and to translate the concatenated query operator into a natural language query operator. For example, the concatenated query object "Contact/addressee" may be further parsed into two separate, parsed query objects, including "Contact" and "addressee," and a natural language query operator "does not start with." Upon parsing of a previously executed software query into one or more natural language clauses or sentences, the system for translating a software query into natural language may also store an association in memory between the natural language clauses or sentences and the previously executed software query, as written in the proper syntax required by the database, API, or application managing the data set upon which the previously executed software query operated. The system for translating a software query to natural language in an embodiment may then present each of the parsed clauses to the user, in a natural language translation easily understood by the user, for potential inclusion within a currently modeled integration process.

The user may select to include one or more of the natural language clauses presented within the integration process the user is currently modeling in embodiments of the present disclosure. Upon receipt of such a user selection, the system for translating software queries to natural language in embodiments may generate a representation of the action the integration process is currently modeled to perform on data sets matching the user-specified query and the user-selected, suggested query, as written in a natural language that is easily understood by the user. For example, in an embodiment in which the user is currently modeling an integration process for retrieving data sets matching the user-specified queries, the system for translating software queries to natural language may combine the user-specified action "GET," the user-defined query object "contact," the conditional word "if," each of the user-selected, previously executed, suggested database queries, and a user-defined query value. The natural language sentence in such an embodiment may read, for example, "Get contact if contact addressee does not contain and does not start with Russia."

Once a user selects a natural language sentence or clause representing a software query the user wishes to execute currently or in the future, the system for translating a software query to natural language in embodiments may automatically generate code instructions that include the previously executed software query, written in the proper syntax. By translating syntax specific queries into natural language sentences for user selection in such a way, the graphical user interface and the system for translating a software query to natural language in embodiments described herein may allow a user not familiar with or possessing little skill in query languages to understand what a given query will likely return. Further, automatic generation of code instructions including the previously executed software query may automate the process of accessing and retrieving data sets meeting search criteria, defined by the user's selection of a natural language sentence, from a database, API, or application without the user having to learn the proper query syntax for that database, API, or application.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the system for translating a software query to natural language 126, or the integration application management system 132 that may operate on servers or systems, remote data centers, or on-box in individual client information handling systems such as a local display device, or a remote display device, according to various embodiments herein. In some embodiments, it is understood any or all portions of code 124 for the system for translating a software query to natural language 126, or the integration application management system 132 may operate on a plurality of information handling systems 100.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the system for translating a software query to natural language 126, or the integration application management system 132 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the system for translating a software query to natural language 126, or the integration application management system 132. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a control device 116, such as an alpha numeric control device, a keyboard, a mouse, touchpad, fingerprint scanner, retinal scanner, face recognition device, voice recognition device, or gesture or touch screen input.

The information handling system 100 may further include a visual user interface 112. The visual user interface 112 in an embodiment may provide a visual designer environment permitting a user to define process flows between applications/systems, such as between trading partner and enterprise systems, and to model a customized business integration process. The visual user interface 112 in an embodiment may provide a menu of pre-defined user-selectable visual elements and permit the user to arrange them as appropriate to model a process and may be displayed on the video display 110. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc.

Further, the graphical user interface 112 allows the user to provide user input providing information relating to trading partners, activities, enterprise applications, enterprise system attributes, and/or process attributes that are unique to a specific enterprise end-to-end business integration process. For example, the graphical user interface 112 may provide drop down or other user-selectable menu options for identifying trading partners, application connector and process attributes/parameters/settings, etc., and dialog boxes permitting textual entries by the user, such as to describe the format and layout of a particular data set to be sent or received, for example, a Purchase Order. The providing of this input by the user results in the system's receipt of such user-provided information as an integration process data profile code set.

In some embodiments, the graphical user interface 112 may also allow a user to provide one or more search terms that may be used to identify data set field values affected by one or more integration processes. A user in such an embodiment may interact with such a user interface 112 to include or exclude terms used by the system for translating a software query to natural language 126 to search for field values to transmit or migrate within an integration process.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs 124, and BIOS/FW code 124 can each be implemented as single programs, or as separate programs carrying out the various features as described herein. Application program interfaces (APIs) such as WinAPIs (e.g. Win32, Win32s, Win64, and WinCE), proprietary APIs (e.g., for SalesForce™ or Oracle's™ NetSuite), or an API adhering to a known open source specification (e.g., Swagger™) may enable application programs 124 to interact or integrate operations with one another.

In an example of the present disclosure, instructions 124 may execute software for identifying, using natural language, data set field values located pursuant to software search queries given in specific query syntaxes or languages. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, and the system for translating a software query to natural language 126, or the integration application management system 132 may include a computer-readable medium 122 such as a magnetic disk, or a solid-state disk in an example embodiment. The computer-readable medium of the memory 104, storage devices 106 and 114, the system for translating a software query to natural language 126, or the integration application management system 132 may store one or more sets of instructions 124, such as software code corresponding to the present disclosure.

The disk drive unit 114, static memory 106, and computer readable medium 122 of the system for translating a software query to natural language 126, or the integration application management system 132 also contain space for data storage such as an information handling system for managing locations of executions of customized integration processes in endpoint storage locations. Connector code sets, and trading partner code sets may also be stored in part in the disk drive unit 114, static memory 106, or computer readable medium 122 of the system for translating a software query to natural language 126, or the integration application management system 132 in an embodiment. In other embodiments, data profile code sets, and run-time engines may also be stored in part or in full in the disk drive unit 114, static memory 106, or computer readable medium 122 of the system for translating a software query to natural language 126, or the integration application management system 132. Further, the instructions 124 of the system for translating a software query to natural language 126, or the integration application management system 132 may embody one or more of the methods or logic as described herein.

In a particular embodiment, the instructions, parameters, and profiles 124, and the system for translating a software query to natural language 126, or the integration application management system 132 may reside completely, or at least partially, within the main memory 104, the static memory 106, disk drive 114, and/or within the processor 102 during execution by the information handling system 100. Software applications may be stored in static memory 106, disk drive 114, the system for translating a software query to natural language 126, or the integration application management system 132.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof.

The system for translating a software query to natural language 126, or the integration application management system 132 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the system for translating a software query to natural language 126, or the integration application management system 132, which may be operably connected to the bus 108. The system for translating a software query to natural language 126 is discussed in greater detail herein below.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the System for translating a software query to natural language 126, or the integration application management system 132 and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
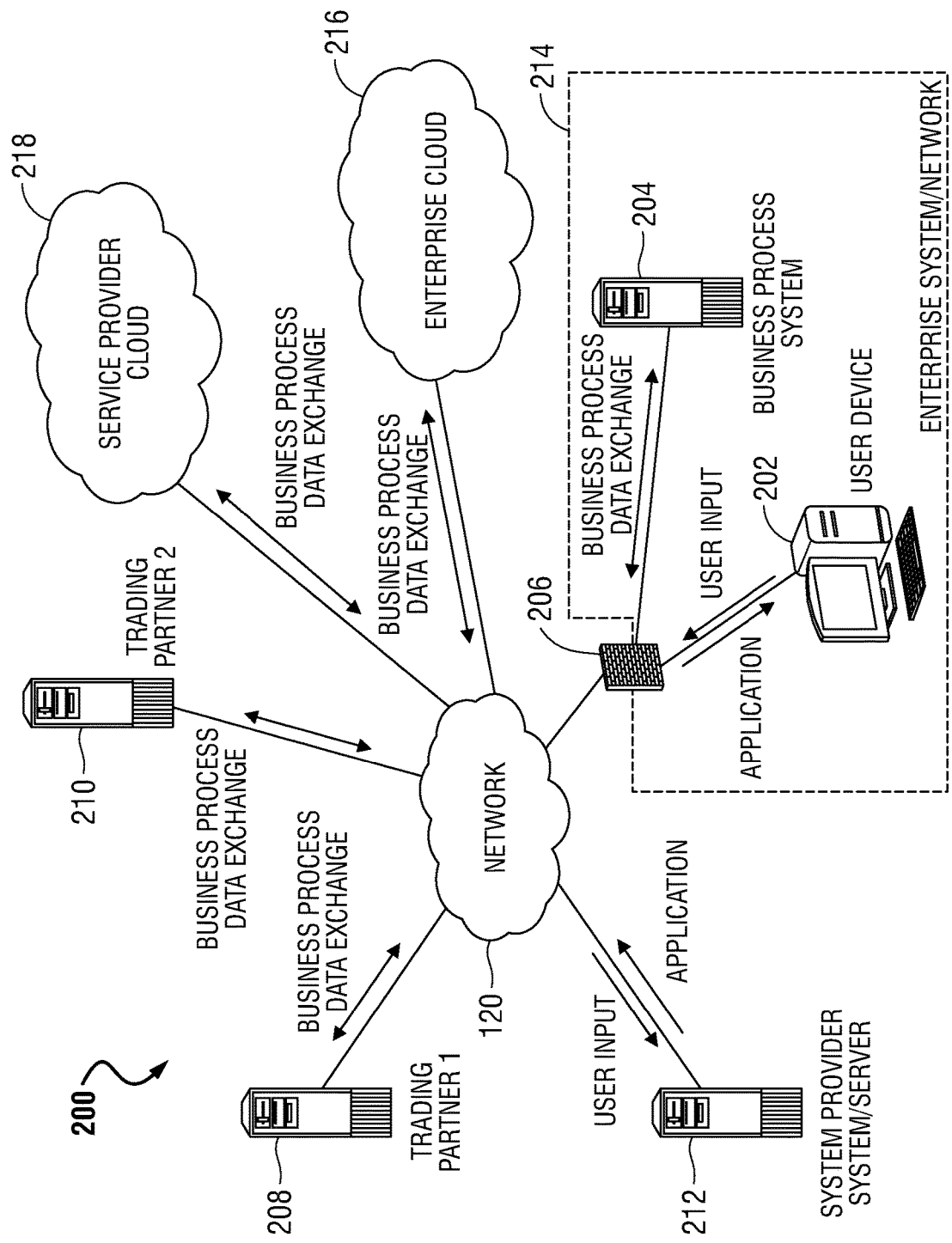
FIG. 2 is a block diagram illustrating a simplified integration network according to an embodiment of the present disclosure.

FIG. 2 is a graphical diagram illustrating a simplified integration network 200 including a service provider system/server 212 and an enterprise system/network 214 in an embodiment according to the present disclosure. Actual integration network topology could be more complex in some other embodiments. As shown in FIG. 2, an embodiment may include conventional computing hardware of a type typically found in client/server computing environments. More specifically, the integration network 200 in an embodiment may include a conventional user/client device 202, such as a conventional desktop or laptop PC, enabling a user to communicate via the network 120, such as the Internet. In another aspect of an embodiment, the user device 202 may include a portable computing device, such as a computing tablet, or a smart phone. The user device 202 in an embodiment may be configured with conventional web browser software, such as Google Chrome®, Firefox®, or Microsoft Corporation's Internet Explorer® for interacting with websites via the network 120. In an embodiment, the user device 202 may be positioned within an enterprise network 214 behind the enterprise network's firewall 206, which may be of a conventional type. As a further aspect of an embodiment, the enterprise network 214 may include a business process system 204, which may include conventional computer hardware and commercially available business process software such as QuickBooks, SalesForce's™ Customer Relationship Management (CRM) Platform, Oracle's™ Netsuite Enterprise Resource Planning (ERP) Platform, Infor's™ Warehouse Management Software (WMS) Application, or many other types of databases.

In an embodiment, the integration network 200 may further include trading partners 208 and 210 operating conventional hardware and software for receiving and/or transmitting data relating to business-to-business transactions. For example, Walmart® may operate trading partner system 208 to allow for issuance of purchase orders to suppliers, such as the enterprise 214, and to receive invoices from suppliers, such as the enterprise 214, in electronic data form as part of electronic data exchange processes. Electronic data exchange process in an embodiment may include data exchange via the world wide web. In other embodiments, electronic data exchange processes may include data exchange via FTP or SFTP.

In an embodiment, a provider of a service ("service provider") for creating on-demand, real-time creation of customized data integration software applications may operate a service provider server/system 212 within the integration network 200. The service provider system/server 212 may be specially configured in an embodiment, and may be capable of communicating with devices in the enterprise network 214. The service provider system/server 212 in an embodiment may host an integration process-modeling user interface in an embodiment. Such an integration process-modeling user interface may allow a user or the system for translating a software query to natural language to model an integration process including one or more sub-processes for data integration through a business process data exchange between an enterprise system/network 214 and outside entities or between multiple applications operating at the business process system 204. The integration process modeled in the integration process-modeling user interface in an embodiment may be a single business process data exchange shown in FIG. 2, or may include several business process data exchanges shown in FIG. 2. For example, the enterprise system/network 214 may be involved in a business process data exchange via network 120 with a trading partner 1, and/or a trading partner 2. In other example embodiments, the enterprise system/network 214 may be involved in a business process data exchange via network 120 with a service provider located in the cloud 218, and/or an enterprise cloud location 216. For example, one or more applications between which a data set field value may be transferred, according to embodiments described herein, may be located remotely from the enterprise system 214, at a service provider cloud location 218, or an enterprise cloud location 216.

The system for translating a software query to natural language, or a user of an integration process-modeling user interface in an embodiment may model one or more business process data exchanges via network 120 within an integration process by adding one or more connector integration elements or code sets to an integration process flow. These connector integration elements in an embodiment may model the ways in which a user wishes data to be accessed, moved, and/or manipulated during the one or more business process data exchanges. Each connector element the system for translating a software query to natural language or the user adds to the integration process flow diagram in an embodiment may be associated with a pre-defined subset of code instructions stored at the service provider systems/server 212 in an embodiment. Upon the user modeling the integration process, the service provide system/server 212 in an embodiment may generate a run-time engine capable of executing the pre-defined subsets of code instructions represented by the connector integration elements chosen by the user or indicated by the system for translating a software query to natural language. The runtime engine may then execute the subsets of code instructions in the order defined by the modeled flow of the connector integration elements given in the integration process flow diagram. In some embodiments, the system for translating a software query to natural language may define the order in which such subsets of code instructions are executed by the runtime engine without creation of or reference to a visual integration process flow diagram. In such a way, an integration process may be executed without the user having to access, read, or write the code instructions of such an integration process.

In other aspects of an embodiment, a user may initiate a business process data exchange between one cloud service provider 218 and one cloud enterprise 216, between multiple cloud service providers 218 with which the enterprise system 214 has an account, or between multiple cloud enterprise accounts 216. For example, enterprise system 214 may have an account with multiple cloud-based service providers 218, including a cloud-based SalesForce™ CRM account and a cloud-based Oracle™ Netsuite account. In such an embodiment, the enterprise system 214 may initiate business process data exchanges between itself, the SalesForce™ CRM service provider and the Oracle™ Netsuite service provider.

Figure 3:
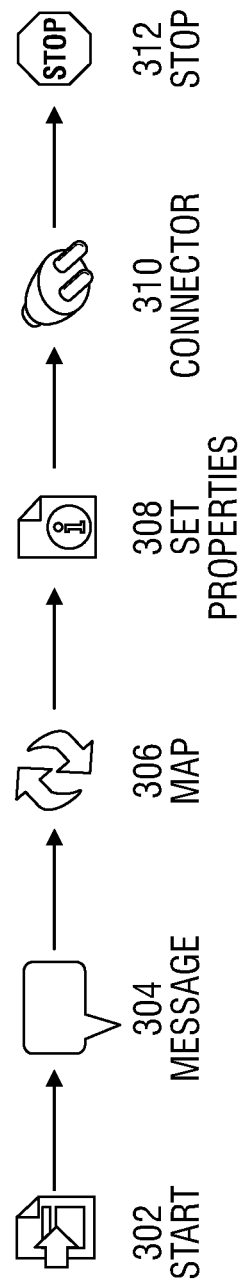
FIG. 3 is a graphical diagram illustrating a user-generated flow diagram of an integration process according to an embodiment of the present disclosure.

FIG. 3 is a graphical diagram illustrating a user-generated flow diagram of an integration process for exchange of electronic data records according to an embodiment of the present disclosure. The flow diagram in an embodiment may be displayed within a portion of a graphical user interface 300 that allows the user to build the process flow, deploy the integration process modeled thereby, and manage data set field values manipulated by such an integration process. A user may generate a flow diagram in an embodiment by providing a chronology of process-representing integration elements via the use of an integration process-modeling user interface. In some embodiments, the integration process-modeling user interface may take the form of a visual user interface. In such embodiments, the user-selectable elements representing integration sub-processes (e.g. connector integration elements) may be visual icons.

An integration process-modeling user interface in an embodiment may provide a design environment permitting a user to define process flows between applications/systems, such as between trading partner and enterprise systems, between on-site data centers and cloud-based storage modules, or between multiple applications, and to model a customized business integration process. Such an integration process-modeling user interface in an embodiment may provide a menu of pre-defined user-selectable elements representing integration sub-processes and permit the user or the data integration protection assistance system to arrange them as appropriate to model a full integration process. For example, in an embodiment in which the integration process-modeling user interface is a visual user interface, the elements may include visual, drag-and-drop icons representing specific units of work (known as process components) required as part of the integration process. Such a process components in an embodiment may include invoking an application-specific connector to access, and/or manipulate data. In other embodiments, process components may include tasks relating to transforming data from one format to another, routing data down multiple paths of execution by examining the contents of the data, business logic validation of the data being processed, etc.

Each process component as represented by integration sub-process icons or elements may be identifiable by a process component type, and may further include an action to be taken. For example, a process component may be identified as a "connector" component. Each "connector" component, when chosen and added to the process flow in the integration process-modeling user interface, may allow the system for translating a software query to natural language or a user to choose from different actions the "connector" component may be capable of taking on the data as it enters that process step. Further the integration-process modeling user interface in an embodiment may allow the user to choose the data set or data element upon which the action will be taken. The action and data element the user chooses may be associated with a connector code set, via the integration application management system, which may be pre-defined and stored at a system provider's memory in an embodiment.

For example, a user in an embodiment may create and customize a "connector" component to represent the action of retrieving data sets stored within a searchable database (or within a backend application accessible via an API supporting a database type query capability) that meet the parameters of a user-defined search query. In embodiments described herein, references made to searchable databases may include such query-capable APIs working in combination with corresponding backend applications controlling or managing data sets. A data set may include a data set field name describing the type of information stored therein, and a data set field value providing a unique subset of information within that category or of that type. For example, a data set describing an address for a contact or customer may include a data set field name "Contact/addressee" and the data set field value may be "John_Smith_123_Main_St_Austin_TX_USA."

A query may be used to locate multiple of such data sets that include the same or similar information meeting the user-specified query parameters. A query may be inclusive, or exclusive in some embodiments. For example, a user may perform an inclusive query that searches for data sets that include a query search term, or a user may perform an exclusive query that searches for data sets that do not include a query search term. In some embodiments, a query may further specifically describe the way in which the user wishes the search term to appear (or not appear, if the query is exclusive) within the data set. For example, a user may perform an inclusive query that searches for data set field values that start with the search term, rather than those that include the search term anywhere within the data set field value. The user may define whether the query is inclusive or exclusive, as well as describe the way in which the user wishes the search term to appear within the data set in an embodiment by providing a query operator. For example, a user wishing to identify data sets that do not contain a given search term may select the query operator "doesNotContain."

Query parameters may also include a query object and a query value. The query value in an embodiment may be the search term described directly above. For example, if a user wishes to identify data sets that do not contain a search term "Russia," the user may provide a query value of "Russia." The query object in an embodiment may define the data set field names for the data sets across which the query should be applied. For example, if a user wishes to identify data sets in which a contact or customer address does not contain the search term "Russia," the user may provide a query object "Contact/addressee," if the user knows that data sets in the database being accessed label contact or customer addresses with the data set field name "Contact/addressee." In other embodiments in which the user does not know the ways in which the database being accessed labels contact or customer addresses, the user may provide the query object "Contact."

The integration application management system in an embodiment may generate a customized connector code set for executing the user-defined query, based on the "connector" component customized by the user. When customizing the "connector" component in an embodiment, the user may provide, via a graphical user interface described in greater detail with respect to FIG. 4, the user-defined query parameters, as well as an action to be performed on data sets meeting the user-defined query parameters. For example, the user may customize the "connector" component to perform the "GET" action in order to retrieve data sets. The user may then be prompted to define the data sets the user wishes to retrieve. If the user chooses to perform a query in order to define these data sets, the user may then be prompted to provide the query parameters via the user interface described with reference to FIG. 4.

Figure 4:
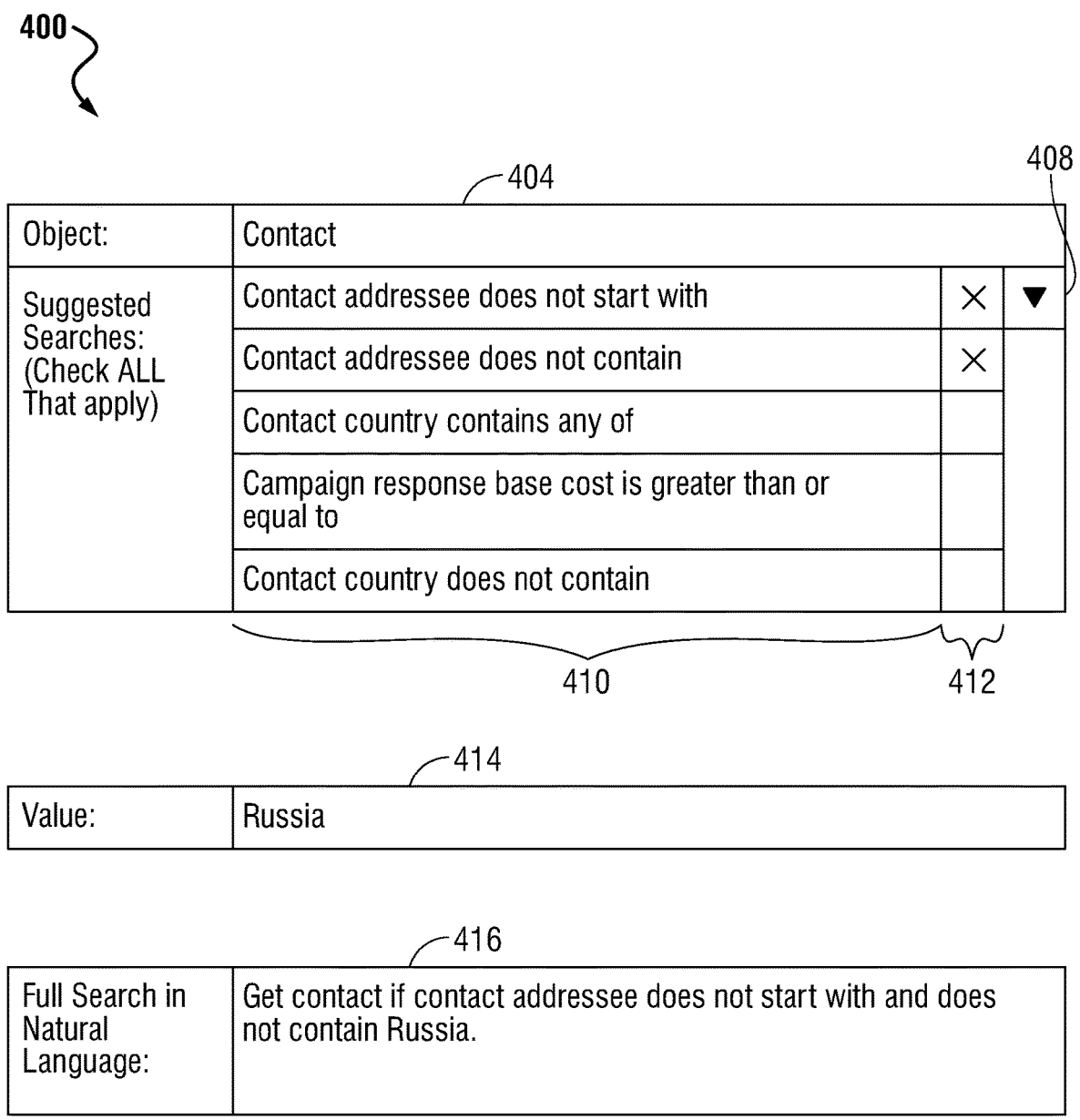
FIG. 4 is a graphical diagram illustrating a user interface for selection of previously executed software queries on a user-specified query object according to an embodiment of the present disclosure.

The integration application management system in an embodiment may receive each of these user-defined query parameters via the graphical user interface described with respect to FIG. 4, including the query object (e.g., "Contact/addressee"), the query operator (e.g., "doesNotContain"), and the query value (e.g., "Russia"), and generate a connector code set capable of executing the query defined by these parameters. For example, the integration application management system may generate the XML code set:

```
<action> get </action>
SELECT      Contact/addressee
FROM        ERPPlatform.contacts
WHERE       Contact/addressee DoesNotStartWith 'Russia'
```

The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram, or by the system for translating a software query into natural language in a non-visual format. Execution of the above code set in such a manner in an embodiment may return a data set stored at the location "ERPPlatform.contacts" having a field name "Contact/addressee" and a field value "John_Smith_123_Main_St_Austin_TX_USA" because the data set field value associated with the data set field name "Contact/addressee" does not contain the word "Russia."

In an embodiment, a user may choose a process component it uses often when interfacing with a specific trade partner or application, and define the parameters of that process component by providing parameter values specific to that trading partner or application. If the user wishes to use this process component, tailored for use with that specific trading partner or application repeatedly, the user may save that tailored process component as a trading partner or component named specifically for that application. For example, if the user often accesses NetSuite™ or SalesForce™, the user may create a database connector process component, associated with a pre-built connector code set that may be used with any database, then tailor the database connector process component to specifically access NetSuite™ or SalesForce™ by adding process component parameters associated with one of these applications. If the user uses this process component in several different integration processes, the user may wish to save this process component for later use by saving it as a NetSuite™ or SalesForce™ process component. In the future, if the user wishes to use this component, the user may simply select the NetSuite™ or SalesForce™ component, rather than repeating the process of tailoring a generic database connector process component with the specific parameters defined above.

As shown in FIG. 3, such process-representing visual elements may include a start element 302, a message element 304, a map element 306, a set properties element 308, a connector element 310, and a stop element 312. Other embodiments may also include a branch element, a decision element, a data process element, or a process call element, for example. A connector element 310, and a start element 302 in an embodiment may represent a sub-process of an integration process describing the accessing and/or manipulation of data. The start element 302 in an embodiment may also operate as a connector element.

In an embodiment, a start element 302 may operate to begin a process flow, and a stop element 312 may operate to end a process flow. As discussed above, each visual element may require user input in order for a particular enterprise or trading partner to use the resulting process. The start element 302 in an embodiment may further allow or require the user to provide data attributes unique to the user's specific integration process, such as, for example, the source of incoming data to be integrated. For example, the user or the system for translating a software query to natural language may use a connector element to define a connection (e.g., an application managing data upon which action is to be taken), and the action to be taken. A user may use a start element 302 to further define a location of such data, according to the language and storage structure understood by the application managing such data. In addition, the data set field value to be accessed according to such a start element 302 in an embodiment may be defined by the user-defined query parameters described directly above. In other embodiments in which such a query is unnecessary in order to identify the targeted data, data set field values to be accessed at the start element 302 may be identified by a data set field name given in a format that adheres to the code language and storage structure used by the application/location/enterprise at which such a data set field value may be accessed. The data set field name to be accessed according to such a start element 302 in an embodiment may also be generated by the system for translating a software query to natural language in an embodiment, based on suggested queries that are similar to the user-defined query parameters, as described in greater detail herein. Insertion of the start element 302, or of a connector element 310 in an embodiment may prompt a user to provide user-defined query parameters via the graphical user interface described in greater detail with reference to FIG. 4 to define the connection and location of data inbound from a database, and may suggest similar query parameters to the user.

A map element 306, or TransformMap element in an embodiment may associate a first data set field name for a data set field value being retrieved from a first application or source with a second data set field name under which that data set field value will be stored at a second application or destination. A set properties element 308 in an embodiment may allow the user to set values identifying specific files. A connector element 310 may operate in a similar manner to the start element 302 to define an action to be taken on an identified data set, and may result in prompting the user to provide user-defined query parameters via a graphical interface. Connector elements 310 in an embodiment may differ from start elements 302 in that they do not necessarily occur at the beginning of an integration process. The stop element 312 in an embodiment may operate to terminate the integration process.

The integration application management system in an embodiment may associate each of the visual elements within the integration process-modeling visual user interface with a set of code instructions written in a machine-readable, executable format. For example, the integration application management system in an embodiment may associate the start element 302 with a connector code set, written in a human-readable, machine-executable code language (e.g., JSON or XML), that includes code instructions for accessing a data set field value associated with a user-specified data set field name defined within the start element 302. In other aspects of an embodiment, the data set field name may be defined within the start element 302 in such an embodiment through execution of a software query, written in a specific query syntax or language by the system for translating a software query into natural language. Upon generation and storage within a memory of each of the code sets associated with each of the visual elements within the integration process-modeling visual user interface in an embodiment, the integration application management system may further generate a runtime engine capable of executing each of these code sets. The integration application management system in an embodiment may transmit the runtime engine and each of the code sets for execution of the integration process modeled by the user via the integration process-modeling visual user interface for execution of the integration process at a remote location (e.g., behind the firewall of a user's enterprise system/network).

FIG. 4 is a graphical diagram illustrating a user interface for selecting natural language descriptions of previously executed software queries on a user-specified query object according to an embodiment of the present disclosure. As described herein, a user may provide data attributes unique to the user's specific integration process, such as, for example, the source of incoming data to be integrated, by selecting and customizing "connector" elements such as those described above with reference to FIG. 3. For example, the user may use a start element to define an application managing data upon which action is to be taken, and an action to be taken on data stored there. A user may use a start element to further define which specific data sets such an action should be taken upon by performing a query to locate specific data sets. If the user interacting with the graphical user interface described with reference to FIG. 3 chooses to define the specific data sets upon which an action represented by the start element 302 should be executed through such a query approach, for example, the user may be prompted to provide query parameters needed to perform such a query via the graphical user interface illustrated in FIG. 4.

As also described herein, the system for translating a software query to natural language may allow users to view queries performed by themselves or other users in the past that also involved a user-specified query object for a current query or search. A user may wish to perform a query similar or identical to one of these previously executed queries, particularly if the previously executed queries displayed are those most often searched or are ranked as most relevant to the one or more query objects specified by a user. In addition to prompting the user to enter the query parameters necessary to identify data sets through a query approach, the graphical user interface described with reference to FIG. 4 may suggest such previously executed and potentially relevant queries for user selection. Further, such a graphical user interface may provide such suggested queries and represent the current user-specified query in natural language that is more easily understood by the user than most searchable database query coding languages. In such a way, the user may select a natural language, easily understood representation of the user's desired database search, and the system for translating software queries into natural language may work in conjunction with the integration application management system to insert code instructions capable of executing such a software query, in the properly formatted query syntax for that database into the full integration process modeled in FIG. 3. As described herein, references made to searchable databases may include query-capable APIs working in combination with corresponding backend applications controlling or managing data sets.

The graphical user interface 400 in an embodiment may include an input field 404 where a user may enter a query object (e.g., "Contact"). As described herein, the query object may define the data set field names across which the query may be performed. For example, setting the query object to "Contact" may result in querying for a user-defined value across data sets having data set field names that include or exclude the word "Contact." The user may enter the user-specified query object (e.g., "Contact") in an embodiment through use of any known input mechanism, including via keyboard or voice. The query object in an embodiment may correspond to a name of an object identified within JSON code instructions or a data set field name within XML code instructions. An object in JSON defines a data set, and includes a data set field name and a data set field value (e.g., name/value pair). Thus, by providing a query object 404 in an embodiment, a user may identify a word that may be used to search across data set field names.

In order to complete such a search or query, a user may also provide at least one query operator to perform on the user-provided query object 404. As described herein, the user may define whether the query is inclusive or exclusive, as well as describe the way in which the user wishes the search term to appear (or not appear) within the data set in an embodiment by providing a query operator. For example, a user wishing to identify data sets that do not contain a given search term may select the query operator "doesNotContain." As another example, a user wishing to identify data set field values that do not start with a given search term may select the query operator "doesNotStartWith."

The user may also enter a query value within the input field 414 in an embodiment. As described herein, each data set may include a data set field name and a data set field value. For example, a data set describing contact information may include a data set field name "Contact" and a data set field value that includes a full physical or shipping address for a particular contact. If a user wishes to identify all known contacts with physical addresses not residing in Russia, for example, the user may select a query object "Contact," an operator "doesNotContain," and a query value "Russia." Such a query may return all data sets where the data set field values associated with data set field names meeting the query object "Contact" do not contain the word "Russia." For example, such a query may return a data set having a data set field name "Contact/addressee" and a data set field value "John_Smith_123_Main_St_Austin_TX_USA" because the data set field name includes the query object "Contact" and the data set field value does not contain the query value "Russia." Similarly, if the user chooses the operator "contains," such a query may return all objects where the shipping or physical address does contain the word "Russia." In some embodiments, the user may enter multiple words or phrases within the input field 414. For example, the user may choose the suggested database query "contact country contains any of," and may input within field 414 the words "Russia" and "China." In such an embodiment, such a query may return all objects where the shipping or physical address contains either Russia or China.

In some embodiments, the system for translating a software query into natural language may display previously executed and suggested database queries that include such query operators on the user-specified query object in natural language. For example, upon entering the query object in the field 404 in an embodiment, the system for translating a software query into natural language may provide a drop-down menu 408 displaying a plurality of suggested database queries that include the user-specified query object "Contact" 404. The system of the present embodiments may determine one or more suggested database query drawn from previously executed database queries based on the received user selected query object. These suggested database queries may be translated into natural language representations such as shown in column 410 of a graphical user interface. Such suggested natural language representations of database queries may be listed in column 410, and may include, for example, "Contact addressee does not start with," "Contact addressee does not contain," Contact country contains any of," "Campaign response base cost is greater than or equal to," or "Contact country does not contain." Each of these suggested database queries may either contain the query object "Contact," or may have been identified as a database query or search relevant to other searches on the query object "Contact." Determination of relevance for identified, suggested database queries in 410 may be relevant to the database query of the currently modeled integration process based on crowd-sourced histories of previously executed integration processes involving the user-defined query object or even the user-defined query value. Crowd-sourced histories in such an embodiment may include metadata associated with a plurality of customers or users of the system for translating a software query into natural language, or associated user interfaces (e.g., user interfaces described with reference to FIGS. 3 and 4 above). Such metadata may describe any information input via these user interfaces, and various logging information describing interaction or behaviors between users and such interfaces, deployments of modeled integration process flows, and executions of modeled integration process flows. A user in an embodiment may select each of the suggested database queries she would like to include in the current query for setting up a portion of the currently modeled integration process by ticking a box adjacent such a suggestion in column 412. Any number of suggested database queries may be selected in some embodiments and those may be deemed selected, suggested database queries. In other embodiments, other methods known in the art of selecting suggested queries may be used, such as highlighting or clicking on the text of the suggested queries themselves.

Upon user selection 412 of one or more suggested database queries from column 410 in an embodiment, the graphical user interface may display a single natural language sentence describing multiple suggested database queries as a single, selected suggested database query in natural language. For example, the graphical user interface may display the natural language sentence "Get contact if contact addressee does not start with and does not contain Russia" 416. Because each of the suggested database queries displayed in column 410, and the full sentence 416 may be written in natural language, users need not be familiar with any particular query syntax or language in order to craft a query on the user-defined query object. In addition, by viewing the natural language representation of previously executed, suggested database queries, a user may quickly and efficiently increase or narrow the breadth of their current query, without having to translate arcane query syntax into human-readable and understandable concepts. Further, the system for translating a software query into natural language may associate each displayed suggested database or software query in memory with code instructions or query search terms, written in the specific syntax required by the application or API managing the data set field values across which the user is searching.

Upon a user's selection of a suggested search shown in column 410, the integration application management system may generate a code set including the query, written in the proper syntax, and integrate that query within the user's integration process (e.g., an integration process modeled by the visual flowchart described with reference to FIG. 3, above). For example, the integration application management system in an embodiment may receive user-defined query parameters, including the user-defined query object (e.g., "Contact"), the suggested query objects (e.g., "Contact addressee"), the suggested query operators (e.g., "doesNotContain" and "doesNotStartWith"), and the query value (e.g., "Russia"), and generate the following XML connector code set capable of executing the query defined by these parameters:

```
<action> get </action>
SELECT      Contact/addressee
FROM        ERPPlatform.contacts
WHERE       Contact/addressee DoesNotStartWith 'Russia'
AND         Contact/addressee DoesNotContain 'Russia'
```

Execution of the above code set in an embodiment may return a data set stored at the location "ERPPlatform.contacts" having a field name "Contact/addressee" and a field value "John_Smith_123_Main_St_Austin_TX_USA" because the data set field value associated with the data set field name "Contact/addressee" does not contain and does not start with the word "Russia." In such a way, a user not familiar with query search syntax or languages may insert a properly formatted software query across multiple data sets, by selecting a natural language representation of that query via the graphical user interface 400.

Figure 5A:
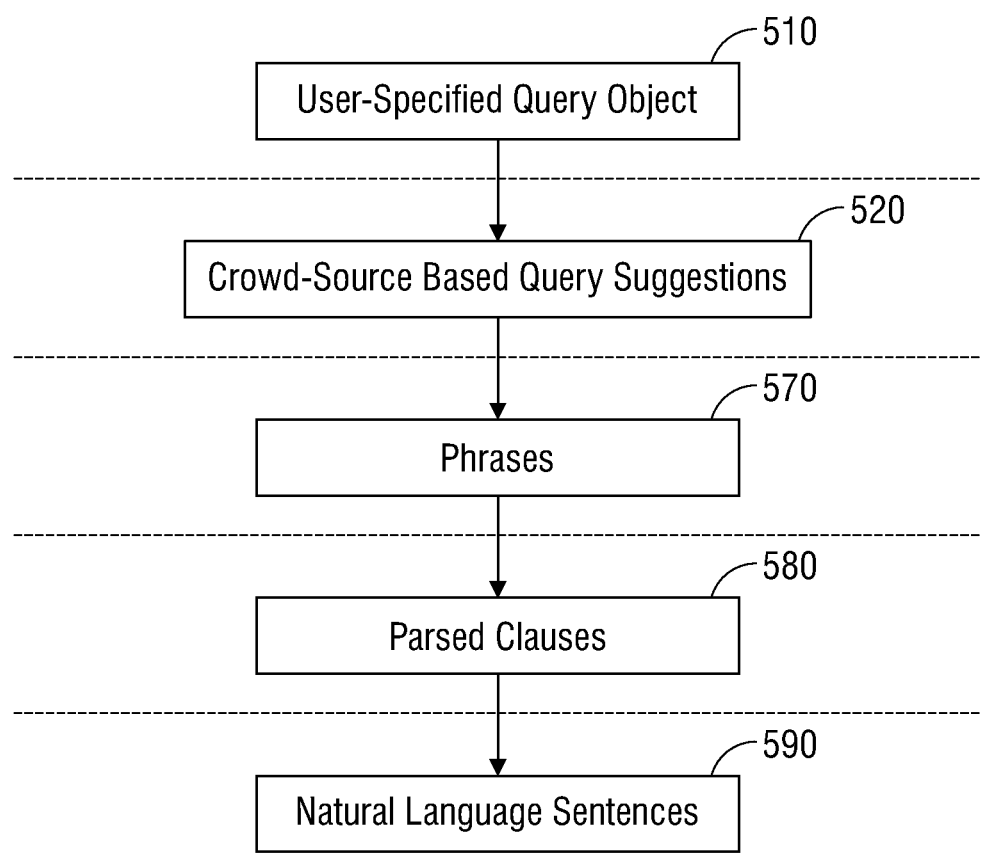
FIG. 5A is a block diagram illustrating translation of query suggestions to a natural language sentence according to an embodiment of the present disclosure.

FIG. 5A is a block diagram illustrating translation of query suggestions for a user-specified query object to a natural language sentence according to an embodiment of the present disclosure. As described herein, a user may wish to perform a query similar or identical to a previously executed query, particularly if the previously executed query is the most often searched or is ranked as most relevant to the one or more query objects specified by a user. Such a user-specified query and previously executed, relevant and suggested queries may be chosen for execution by a user as part of a larger integration process, such as the process modeled by the visual elements represented in FIG. 3.

In an embodiment, a user may provide a user-specified query object 510 (e.g., "Contact") via a graphical user interface in order to indicate intent to execute a query across data sets having data set field names related to, including, or described by the user-specified query object 510. The system for translating a software query into natural language may then retrieve one or more previously executed queries 520 associated with the user-specified query object 510 in memory in an embodiment. Such previously executed queries 520 may include suggestions made based on crowd-sourced information, including ranked analyses of frequency and utility of previously executed queries. As described herein, crowd-sourced information in such an embodiment may include metadata associated with a plurality of customers or users of the system for translating a software query into natural language and may describe any information input via user interfaces described herein, and various logging information describing interaction or behaviors between users and such interfaces, deployments of modeled integration process flows, and executions of modeled integration process flows.

In other embodiments, the user may further specify which data set field values associated with data set field names that involve the word "Contact" she would like to have returned by supplying further query information, such as a query operator, written in the syntax accepted by the database managing such field name/value pairs. For example, a user may further specify that she wishes the database to return data set field name/value pairs having data set field names that start with the word "Contact" by further including the query operator "StartsWith." As another example, a user may further specify that she wishes the database to return data set field name/value pairs having data set field names that do not include the word "Contact" by further including the query operator "DoesNotContain." The user may also provide a query value defining a term that data sets matching the query parameters must include (if the query is inclusive—e.g., uses a query operator "Contains"), or must exclude (if the query is exclusive—e.g., uses a query operator "DoesNotContain"). For example, if a user wishes to identify data sets that do not contain a search term "Russia," the user may provide a query value of "Russia." As described herein, references made to searchable databases may include query-capable APIs working in combination with corresponding backend applications controlling or managing data sets.

The system for translating a software query to natural language in embodiments described herein may receive such user-specified query parameters, or such user-selected crowd-source based query suggestions adhering to the syntax requirements of a given database, and parse the user-specified query parameters or user-selected crowd-source based query suggestions into phrases. User-specified query parameters and user-selected crowd-source based query suggestions in an embodiment may include a concatenated query object, a concatenated query operator, and a query value. For example, a query (either user-specified or suggested) in an embodiment may include a concatenated query object "Contact/addressee," a concatenated query operator "doesNotContain," and a query value "Russia." Each of these parameters in an embodiment may be given in the proper syntax required for queries to the database in control of data sets being queried. In some embodiments, the proper syntax requires concatenation of multiple natural language words into a single concatenated query object, or concatenated query operator. For example, the concatenated query object "Contact/addressee" may concatenate or combine the natural language words "Contact" and "addressee" into the single, concatenated query object "Contact/addressee," and the concatenated query operator "doesNotContain" may concatenate or combine the natural language words "does," "not," and "contain."

The system for translating a software query to natural language in an embodiment may parse such database queries into phrases by identifying and separating concatenated query objects from concatenated query operators. For example, the system for translating a software query to natural language may parse a query (e.g., a crowd-source based query suggestion 520 or a query involving an operator acting upon a user-specified query object 510) into a phrase 570 including concatenated query objects and concatenated query operators. The parsed phrase may then be further parsed into clauses 580 by identifying and separating multiple concatenated query objects within a single phrase 570 into separate, parsed query objects. For example, a phrase including the concatenated query object "Contact/addressee" may be parsed into a clause including the separate, parsed query object "Contact" and the parsed query object "addressee." Further, a clause may translate a concatenated query operator, written in compatible database syntax into a natural language query operator. For example, a clause may include one or more concatenated query objects and a natural language query operator "does not contain." Thus, such a full clause 580 may include the parsed query object "Contact," the parsed query object "addressee" and the natural language query operator "does not contain."

The system for translating a software query to natural language in an embodiment may then generate a natural language sentence 590 representing the action a connector element illustrated in FIG. 3 is customized to take on a data set matching the query parameters (defined either directly by the user or through user selection of a suggested crowd-source based query 520), for user approval or selection. For example, a start element may be customized in an embodiment to retrieve data sets matching the user-selected query parameters. In such an embodiment, the system for translating a software query to natural language may generate a natural language sentence 590 by concatenating together the action to be taken (e.g., "GET"), the user-specified query object 510, the word "if," the parsed clause 580 (e.g., "Contact" and "addressee" "does not contain"), and the query value (e.g., "Russia"). The resulting natural language sentence 590 in such an embodiment may then read "Get contact if contact and addressee does not contain Russia." By translating syntax specific queries (e.g., 520) into natural language sentences 590 in such a way, the graphical user interface and the system for translating a software query to natural language in embodiments described herein may allow a user not familiar with query languages to understand what a given query will likely return.

Figure 5B:
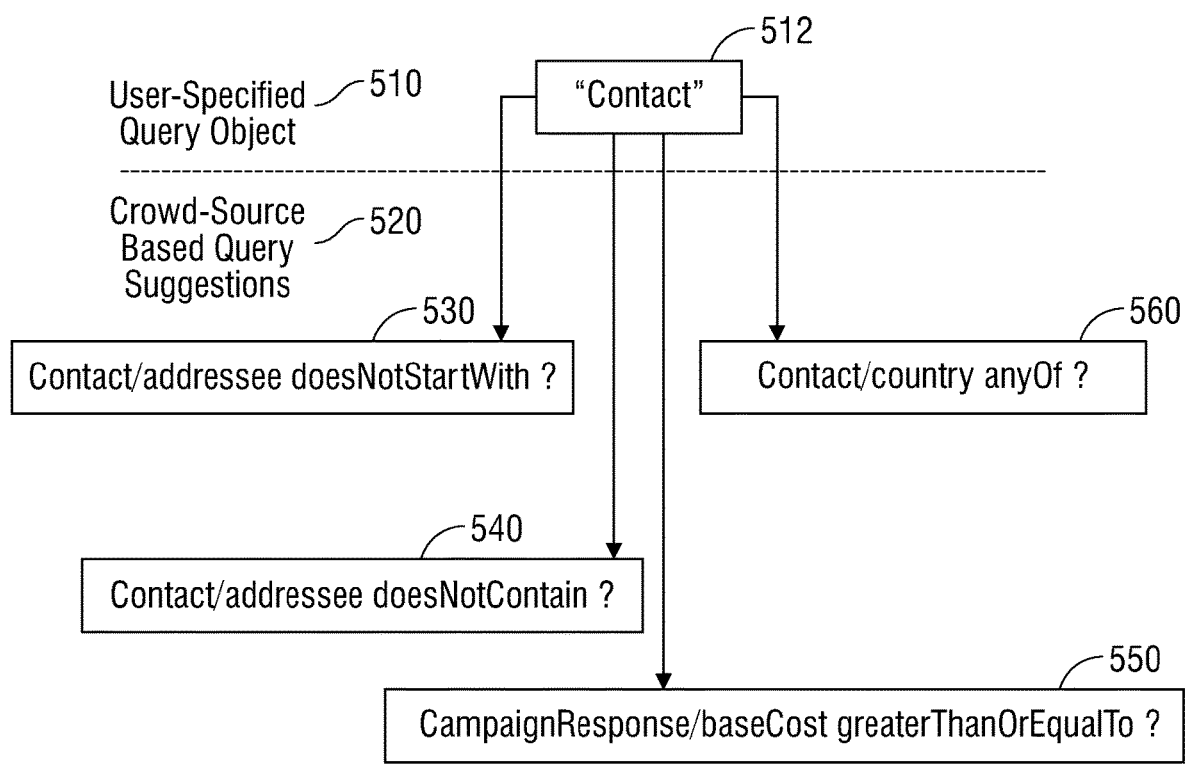
FIG. 5B is a block diagram illustrating receiving suggested software queries associated with a user-specified query object according to an embodiment of the present disclosure.

FIG. 5B is a block diagram illustrating receiving a plurality of suggested previously executed or crowd-sourced software queries associated with a user-specified query object according to an embodiment of the present disclosure. As described herein, the system for translating a software query to natural language may allow users performing a current query on a user-specified query object 510 to view queries performed by themselves or other users in the past that also involved the user-specified query object 510. Upon receipt of the user-specified query object 510 in an embodiment, the system for translating a software query to natural language may identify one or more of such previously executed queries associated with the user-specified query object 510 in a memory. For example, a user may input a user-specified query object "Contact" 512 into a graphical user input, and identify the previously executed queries "Contact/address doesNotStartWith?" 530, "Contact/addressee doesNotContain?" 540, "campaignResponse/baseCost greaterThanOrEqualTo?" 550, and "Contact/country anyOf?" 560 as being associated with the user-specified query object "Contact" 512.

These previously executed queries 520 (e.g., 530, 540, 550, and 560) may be associated in memory with the user-specified query object 510 (e.g., "Contact" 512) in some embodiments based on crowd-sourced information indicating a likelihood that a user querying the user-specified query object 510 may benefit from execution of these previously executed queries. For example, if a plurality of users of a given application routinely perform a known query on the user-specified query object 510, that known query may be identified as a useful query for that user-specified query object 510. The determination of whether a previous query is likely to be useful for future queries involving the same object may be made based on historical analytics, machine learning algorithms, or any known methodology in an embodiment. Further, such an analysis may be performed on previous queries executed only by the current querying user, or may be performed across a plurality of uses of the same application the current user is attempting to query. In still other embodiments, such an analysis may be performed across multiple users of multiple applications.

Figure 5C:
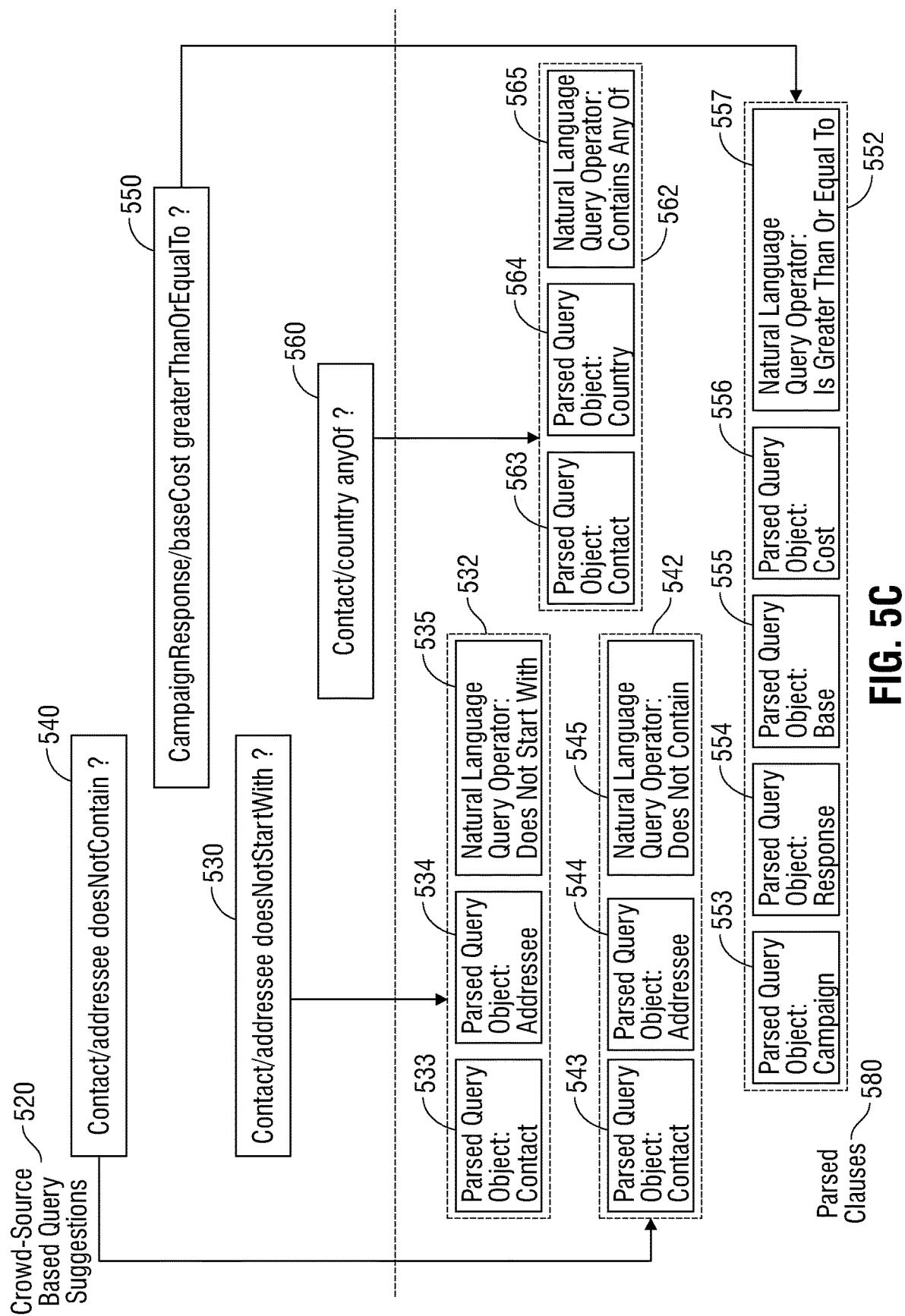
FIG. 5C is a block diagram illustrating translation of suggested software queries to parsed clauses according to an embodiment of the present disclosure.

FIG. 5C is a block diagram illustrating translation of suggested software queries from a standardized software query to parsed clauses according to an embodiment of the present disclosure. The system for translating a software query to natural language in an embodiment may receive the user-selected crowd-source based query suggestions (e.g., 530, 540, 550, or 560) adhering to the syntax requirements of a given database, and parse the user-specified query parameters or user-selected crowd-source based query suggestions into parsed clauses 580. As described herein, user-selected crowd-source based query suggestions (e.g., 530, 540, 550, or 560) in an embodiment may include a concatenated query object, and a concatenated query operator. For example, query suggestion 530 may include a concatenated query object "Contact/addressee," and a concatenated query operator "doesNotStartWith." As another example, query suggestion 540 may include a concatenated query object "Contact/addressee," and a concatenated query operator "doesNotContain." In another example, query suggestion 550 may include a concatenated query object "CampaignResponse/baseCost," and a concatenated query operator "greaterThanOrEqualTo." In yet another example, query suggestion 560 may include a concatenated query object "Contact/addressee," and a concatenated query operator "doesNotStartWith." Each of these suggested queries in an embodiment may be given in the proper syntax required for queries to the database in control of data sets being queried, which may require concatenation of multiple natural language words into a single concatenated query object, or concatenated query operator. For example, the concatenated query object "Contact/addressee" may concatenate or combine the natural language words "Contact" and "addressee" into the single, concatenated query object "Contact/addressee," and the concatenated query operator "doesNotContain" may concatenate or combine the natural language words "does," "not," and "contain."

The system for translating a software query to natural language in an embodiment may parse such database queries into parsed clauses by identifying and separating multiple concatenated query objects into separate, parsed query objects and translating concatenated query operators, written in compatible database syntax into a natural language query operators. For example, the system for translating a software query to natural language in an embodiment may parse the suggested query "Contact/addressee doesNotStartWith?" 530 into the parsed clause 532 that includes parsed query objects "Contact" 533 and "addressee" 534, and translate the concatenated query operator "doesNotStartWith" into the natural language query operator "Does Not Start With" 535 by separating the concatenated words in the concatenated query operator. As another example, the system for translating a software query to natural language in an embodiment may parse the suggested query "Contact/addressee doesNotContain?" 540 into the parsed clause 542 that includes the parsed query objects "Contact" 543 and "addressee" 544, and translate the concatenated query operator "doesNotContain" into the natural language query operator "Does Not Contain" 545. In yet another example, the system for translating a software query to natural language in an embodiment may parse the suggested query "CampaignResponse/baseCost greaterThanOrEqualTo?" 550 into the parsed clause 552 that includes the parsed query objects "Campaign" 553, "Response" 554, "Base" 555, and "Cost" 556, and translate the concatenated query operator "greaterThanOrEqualTo" into the natural language query operator "Is Greater Than Or Equal To" 552. In still another example, the system for translating a software query to natural language in an embodiment may parse the suggested query "Contact/country AnyOf?" 560 into the parsed clause 562 that includes the parsed query objects "Contact" 563 and "Country" 564, and translate the concatenated query operator "AnyOf" into the natural language query operator "Contains Any Of" 565. The process by which each suggested query 520 is parsed into parsed clauses 580 may be described in greater detail herein with respect to FIGS. 6A and 6B.

Once the suggested queries 520 are parsed into parsed clauses 580 in an embodiment, the system for translating software queries to natural language may present each of the parsed clauses 580 to the user for potential inclusion within the query the user wishes to perform as part of the larger integration process modeled by the process elements illustrated in FIG. 3. The system for translating software queries to natural language in an embodiment may allow the user to choose which of the parsed clauses 580 to include within such a query through the use of the graphical user interface described with reference to FIG. 4. For example, the system for translating software queries to natural language in an embodiment described with reference to FIG. 4 may allow the user to select to include the parsed clause "contact addressee does not start with" 532 and "contact addressee does not contain" 542. The user in such an example embodiment may not select other available parsed clauses, such as "contact country contains any of" 562 and "Campaign response base cost is greater than or equal to" 552.

Figure 5D:
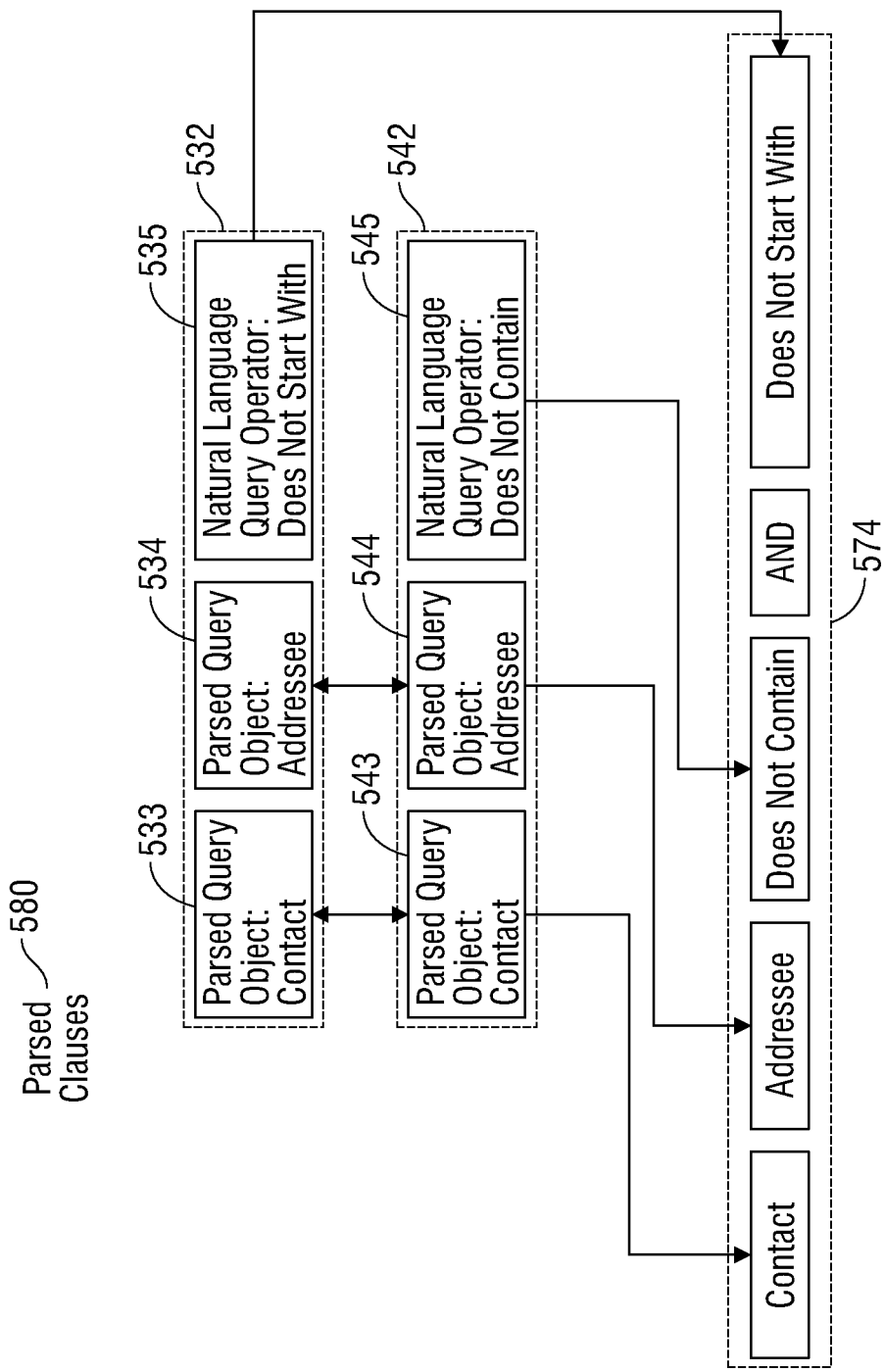
FIG. 5D is a block diagram illustrating combining of parsed clauses having an identity of parsed query objects into a single clause according to an embodiment of the present disclosure.

FIG. 5D is a block diagram illustrating combining of parsed clauses having an identity of parsed query objects into a single natural language clause according to an embodiment of the present disclosure. In some embodiments, two or more user-selected suggested queries may perform separate query operations on the same query objects. For example, in an embodiment in which a user has selected the suggested queries "Contact/addressee doesNotContain" and "Contact/addressee doesNotStartWith," the user has effectively chosen to perform two separate query operators (e.g., "doesNotContain" and "doesNotStartWith") on the same two parsed query objects (e.g., "Contact" and "Addressee"). In natural language, each of the parsed query objects may be represented by a noun upon which a verb representing a query operator acts. For example, the natural language clause 532 in an embodiment may include the verb (natural language query operator) "does not start with" 535 acting on the nouns (parsed query objects) "Contact" 533 and "Addressee" 534. As another example, the natural language clause 542 in an embodiment may include the verb "does not contain" 545 acting on the same nouns "Contact" 543 and "Addressee" 544.

Rather than repeating the same nouns in two separate clauses, it is more natural to represent the noun only once, and have two separate verbs acting on the same noun. For example, the separate natural language clauses 532 and 542 in an embodiment may be combined into a single natural language clause 574 reading "Contact addressee does not contain and does not start with." This may be achieved by concatenating together the parsed query objects that are identical in both clauses 532 and 542, and each of the operators 535 and 545, with the operators separated by a conjunction (e.g., "and"). Such a combination of natural language clauses (e.g., 532 and 542) into a single natural language clause 574 in an embodiment may be performed when the query fields in each of the natural language clauses (e.g., 532 and 542) are identical to one another.

Figure 5E:
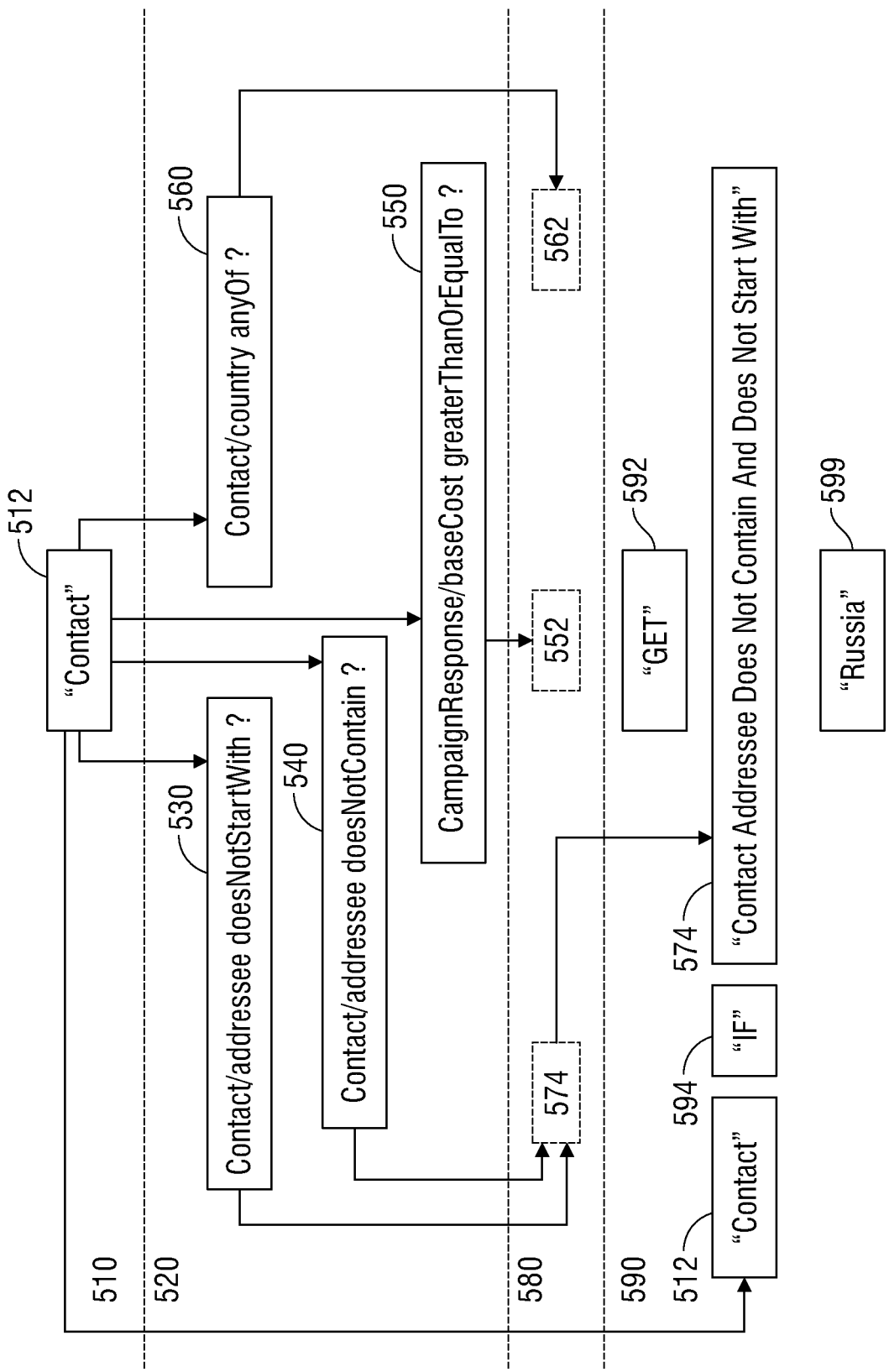
FIG. 5E is a block diagram illustrating generating a single natural language sentence representing queries according to an embodiment of the present disclosure.

FIG. 5E is a block diagram illustrating generating a single natural language sentence representing each of the user-selected, suggested queries according to an embodiment of the present disclosure. The system for translating a software query to natural language in an embodiment may generate a natural language sentence 590 representing the action a connector element illustrated in FIG. 3 is customized to take on a data set matching the suggested crowd-source based query 520, for user approval or selection. For example, a start element 302 in FIG. 3 may be customized in an embodiment to retrieve data sets matching the user-selected query parameters by selecting the action "get" and selecting to identify the dataset to be retrieved using a database query. In such an embodiment, the system for translating a software query to natural language may then prompt the user to define the query parameters via the graphical user interface described with reference to FIG. 4. The user may then enter a query object (e.g., "contact"), and the system for translating software queries to natural language may retrieve previously executed, suggested queries that are associated in memory with the entered query object (e.g., "contact").

As described herein, once the suggested queries are parsed into parsed clauses 580 in an embodiment, the system for translating software queries to natural language may present each of the parsed clauses 580 to the user for potential inclusion within the query the user wishes to perform as part of the larger integration process. For example, the system for translating software queries to natural language in an embodiment may allow the user to select to include the parsed clause "contact addressee does not start with" and "contact addressee does not contain." The user in such an example embodiment may not select other available parsed clauses, such as "contact country contains any of" 562 and "Campaign response base cost is greater than or equal to" 552.

Upon user selection of one or more parsed clauses 580 to include within the database query the user wishes to perform, the system for translating software queries into natural language may generate a natural language sentence 590 by concatenating together the action to be taken (as specified by the user while creating the start element, e.g., "GET"), the user-specified query object 510, the word "if" 594, the parsed clauses selected by the user via the graphical user interface described with reference to FIG. 4 (e.g., parsed clause 574), and the query value "Russia" 599 given by the user via the graphical user interface described with reference to FIG. 4. The resulting natural language sentence 590 in such an embodiment may then read "Get contact if contact and addressee does not contain and does not start with Russia." By translating syntax specific queries (e.g., 520) into natural language sentences 590 in such a way, the graphical user interface and the system for translating a software query to natural language in embodiments described herein may allow a user not familiar with query languages to understand what a given query will likely return.

Figure 6A:
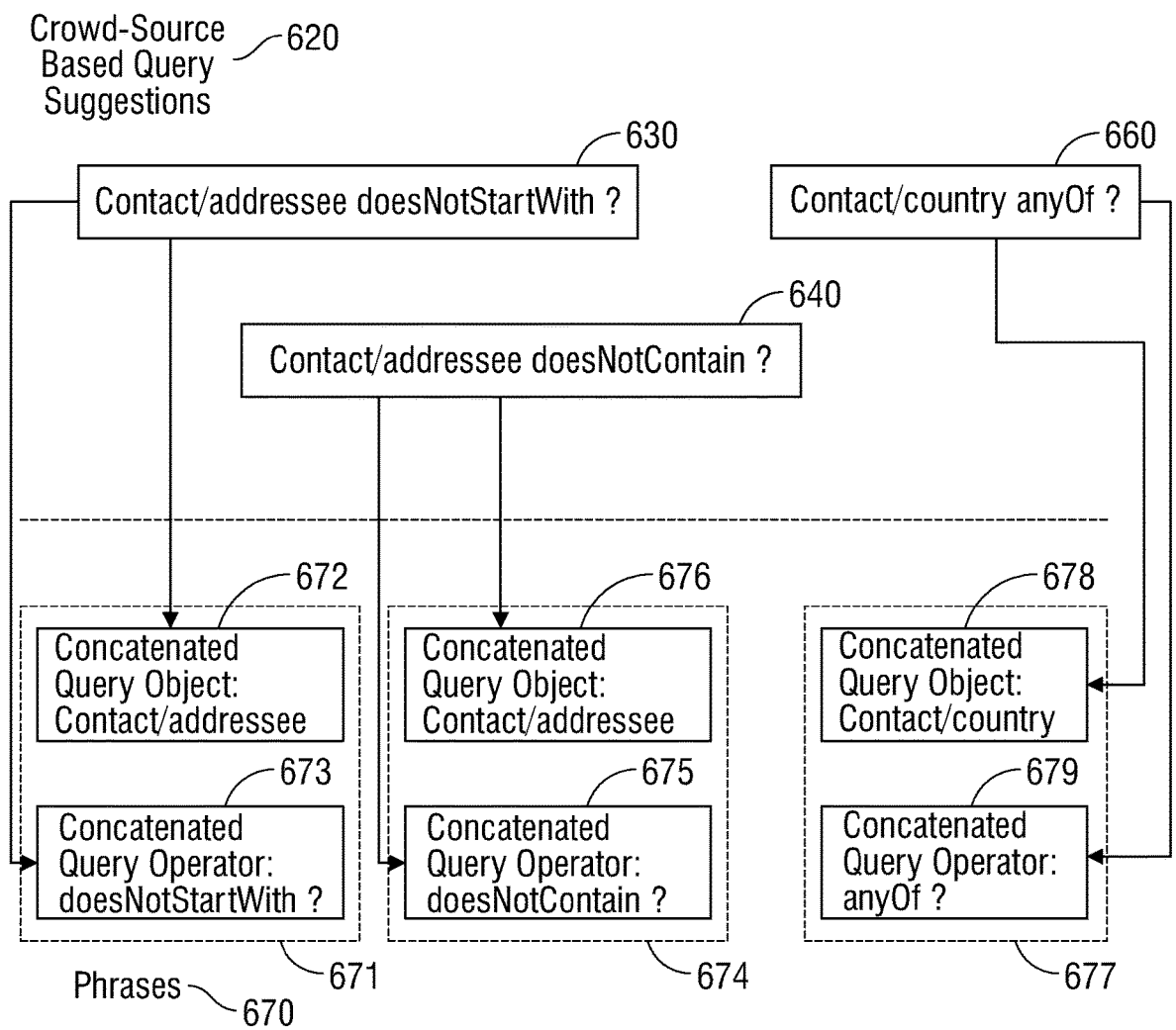
FIG. 6A is a block diagram illustrating parsing a software query into a phrase according to an embodiment of the present disclosure.

FIG. 6A is a block diagram illustrating parsing a previously executed, user-selected software query into a phrase according to an embodiment of the present disclosure. As described herein, the system for translating a software query to natural language in embodiments described herein may receive user-selected crowd-source based query suggestions 620 adhering to the syntax requirements of a given database, and parse the crowd-source based query suggestions 620 into phrases. Crowd-source based query suggestions 620 in an embodiment may include a concatenated query object, and a concatenated query operator. For example, a query suggestion in an embodiment may include a concatenated query object "Contact/addressee," and a concatenated query operator "doesNotContain." Each of these parameters in an embodiment may be given in the proper syntax required for queries to the database in control of data sets being queried, which may require concatenation of multiple natural language words into a single concatenated query object, or concatenated query operator. For example, the concatenated query object "Contact/addressee" may concatenate or combine the natural language words "Contact" and "addressee" into the single, concatenated query object "Contact/addressee," and the concatenated query operator "doesNotContain" may concatenate or combine the natural language words "does," "not," and "contain." As described herein, references made to searchable databases may include query-capable APIs working in combination with corresponding backend applications controlling or managing data sets.

The system for translating a software query to natural language in an embodiment may parse such database queries 620 into phrases 670 by identifying and separating concatenated query objects from concatenated query operators. For example, the system for translating a software query to natural language may parse a query "Contact/addressee doesNotStartWith?" 630 into a phrase 671 including concatenated query objects "Contact/addressee" 672 and concatenated query operator "doesNotStartWith" 673. As another example, the system for translating a software query to natural language may parse a query "Contact/addressee doesNotContain?" 640 into a phrase 674 including concatenated query objects "Contact/addressee" 676 and concatenated query operator "doesNotStartWith" 675. As yet another example, the system for translating a software query to natural language may parse a query "Contact/country anyOf?" 660 into a phrase 677 including concatenated query objects "Contact/country" 678 and concatenated query operator "anyOf" 677.

The system for translating a software query into natural language in an embodiment may determine which portions of the crowd-source based query suggestions 620 represent concatenated query objects, and which portions represent concatenated query operators based on known query syntaxes, or based on placement of that clause within the full query 630. For example, some known query languages require multiple query objects to be concatenated together, but separated by a slash, a dash, a period, or an underscore. In such an embodiment, the system for translating a software query into natural language may identify the portion "Contact/addressee" of query 630 as meeting these syntax requirements, and thus identify the phrase "Contact/addressee" as a concatenated query object 672. As another example, proper syntax for a query may include a concatenated query object, a concatenated query operator, and a question mark, each separated from one another with a single space. In such an embodiment, the system for translating a software query into natural language may identify the portion "Contact/addressee," which begins the query, and is followed by a space as the concatenated query object "Contact/address" 672.

The system for translating a software query into natural language may perform similar analysis on the remainder of the query 630 in an embodiment to also identify a concatenated query operator therein. For example, in an embodiment in which a proper syntax for a query includes a concatenated query object, a concatenated query operator, and a question mark, each separated from one another with a single space, the system for translating a software query into natural language may identify the portion "doesNotStartWith" within query 630 as the concatenated query operator 673 because it is preceded and followed with a single space. As another example, a query syntax may list all known concatenated query operators, or may represent concatenated query operators as a concatenated series of capitalized natural language words, with no spaces in between. In such an embodiment, the system for translating a software query into natural language may identify the portion "doesNotStartWith" within query 630 as the concatenated query operator 672, because it is a known concatenated query operator, or because it includes the concatenated, capitalized natural language words "does not start with," without any spaces.

Figure 6B:
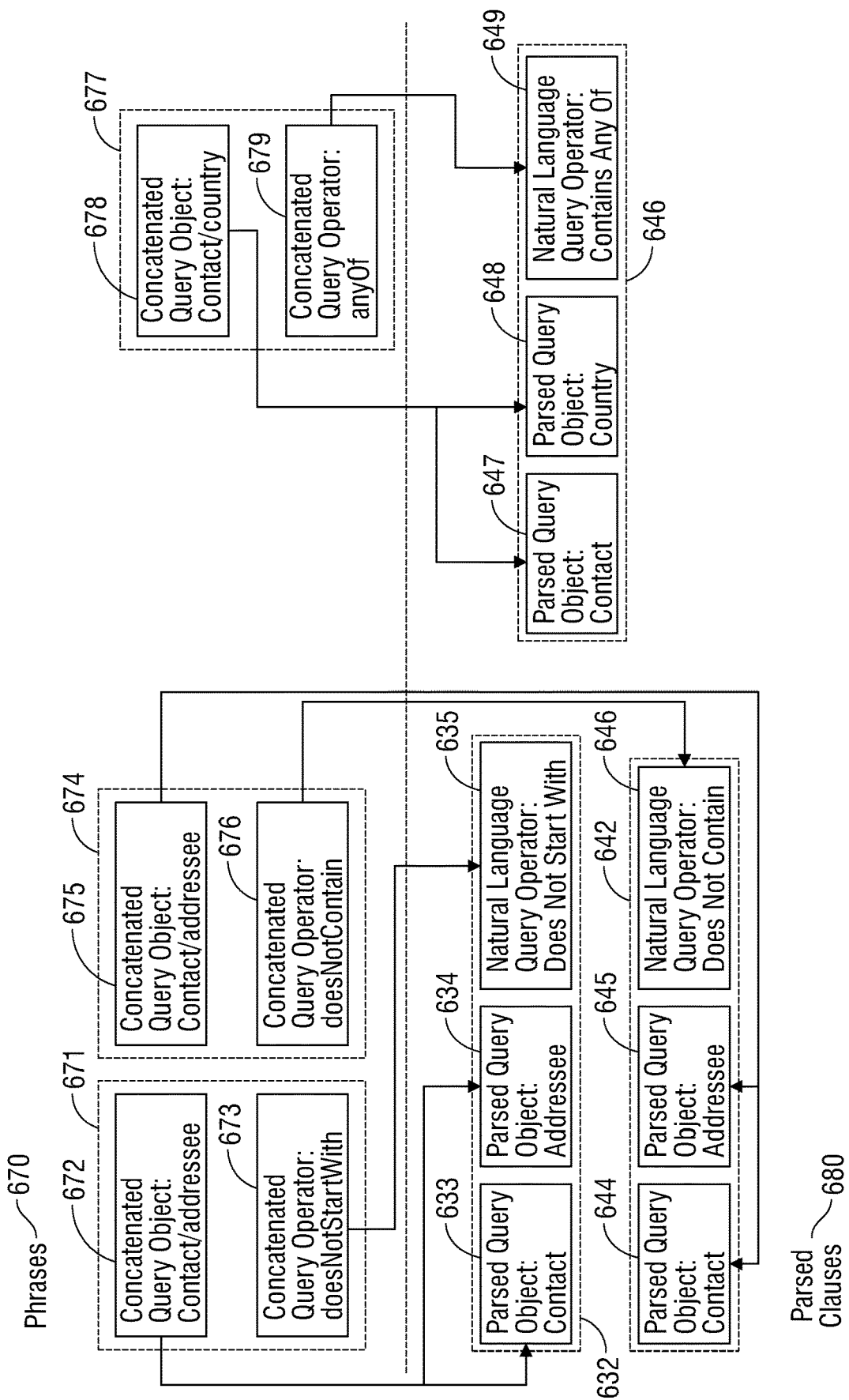
FIG. 6B is a block diagram illustrating parsing phrases into parsed clauses according to an embodiment of the present disclosure.

FIG. 6B is a block diagram illustrating parsing phrases into clauses having separate, parsed query objects and natural language operators according to an embodiment of the present disclosure. Upon parsing a database or software query into a phrase, the parsed phrase may be further parsed into clauses 680. As described herein, a parsed phrase may contain a concatenated query object and a concatenated query operator. For example, phrase 671 may include the concatenated query object "Contact/addressee" 671 and the concatenated query operator "doesNotStartWith" 673. As another example, phrase 674 may include the concatenated query object "Contact/addressee" 675 and the concatenated query operator "doesNotContain" 676. As yet another example, phrase 677 may include the concatenated query object "Contact/country" 678 and the concatenated query operator "anyOf" 679.

The parsed phrases 670 in an embodiment may be further parsed into clauses 680 by identifying and separating concatenated query objects within a phrase 670 into separate, parsed query objects. For example, the system for translating software queries to natural language in an embodiment may parse the phrase 671 into clause 632 by separating the concatenated query object "Contact/addressee" 672 into the separate, parsed query objects "Contact" 633 and "Addressee" 634. As another example, the system for translating software queries to natural language in an embodiment may parse the phrase 674 into clause 642 by separating the concatenated query object "Contact/addressee" 675 into the separate, parsed query objects "Contact" 644 and "Addressee" 645. As yet another example, the system for translating software queries to natural language in an embodiment may parse the phrase 677 into clause 646 by separating the concatenated query object "Contact/country" 678 into the separate, parsed query objects "Contact" 647 and "Country" 648.

Further, a clause may translate a concatenated query operator, written in compatible database syntax into a natural language query operator. For example, the system for translating software queries to natural language in an embodiment may translate the concatenated query operator "doesNotStartWith" 673 in phrase 671 into the natural language query operator "Does Not Start With" 635 of clause 632. As another example, the system for translating software queries to natural language in an embodiment may translate the concatenated query operator "doesNotContain" 676 in phrase 674 into the natural language query operator "Does Not Contain" 646 of clause 642. As yet another example, the system for translating software queries to natural language in an embodiment may translate the concatenated query operator "anyOf" 679 in phrase 677 into the natural language query operator "Contains Any Of" 649 of clause 646.

In an embodiment in which a list of all available concatenated query operators is known, the system for translating a software query to natural language may identify a natural language translation associated in a memory with a given concatenated query operator within a phrase. For example, the system for translating a software query into natural language may determine the concatenated query operator "doesNotStartWith" 673 within phrase 671 with a stored natural language query operator "does not start with" 635. In another embodiment in which a query syntax represents concatenated query operators as a concatenated series of capitalized natural language words, with no spaces in between, the system for translating a software query to natural language may separate each of the concatenated words from one another. For example, the system for translating a software query into natural language may separate the concatenated query operator "doesNotContain" 676 into the natural language query operator "does not contain" 676. In some embodiments, the system for translating a software query into natural language may also add a verb or other word to translate a known operator into natural language. For example, in an embodiment in which the query operator is "anyOf" 679, the system for translating a software query into natural language may add the verb "contains" to form the natural language operator "contains any of" 649.

After separating parsed query objects from one another and translating concatenated query operators into natural language query operators, the system for translating a software query into natural language may combine each of the parsed query objects and at least one natural language query operator into a single, parsed clause in an embodiment. For example, the system for translating a software query into natural language in an embodiment may combine the parsed query object "Contact" 633, the parsed query object "addressee" 634, and the natural language query operator "does not start with" 635 into a single parsed clause 635. Similarly, the system for translating a software query into natural language may combine the parsed query object "Contact" 644, the parsed query object "addressee" 645, and the natural language query operator "does not contain" 646 into a single, parsed clause 642, and may combine the parsed query object "Contact" 647, the parsed query object "country" 648, and the natural language query operator "contains any of" 649 into a single, parsed clause 646.

As described herein with reference to FIG. 5D, multiple parsed clauses may be combined together when each of the clauses share an identity of parsed query objects. For example, parsed clauses 632 and 642 may be combined together in such a way, since they both contain only the parsed query objects "Contact" (e.g., at 633 and 644) and "addressee" (e.g., at 634 and 645). In contrast, the parsed clause 646 may not be similarly combined with either clause 632 or 642, despite the fact that each of clauses 632, 642, and 646 contain the parsed query object "contact" (e.g., at 633, 644, and 647). This may be the case, for example, because the clause 646 also contains the parsed query object "country" 648, not found in clauses 632 or 642. Thus, no identity of parsed query objects exists between clauses 646 and 632, or between clauses 646 and 642, making combination with a connector word such as "and" in a resulting natural language sentence problematic.

Figure 7:
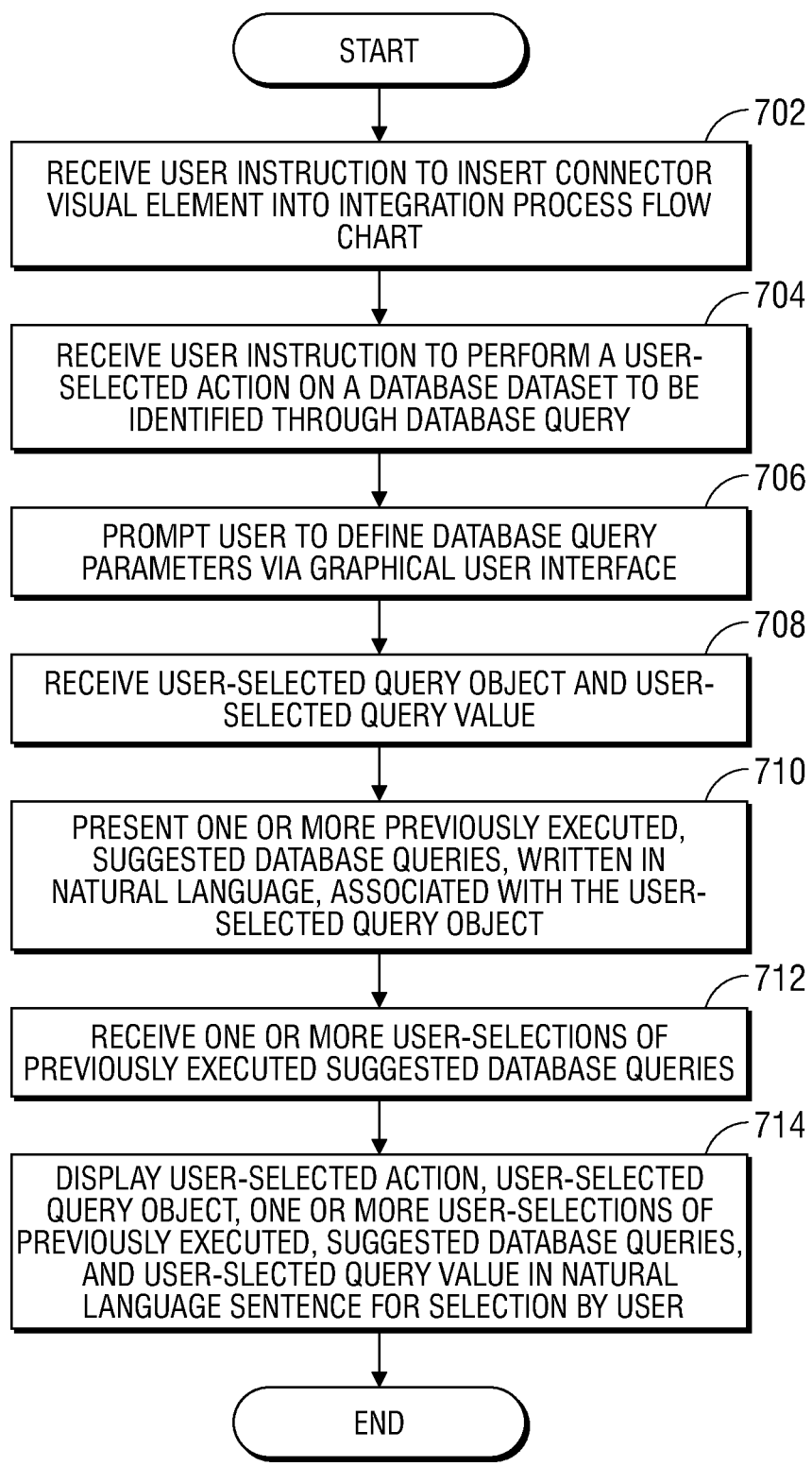
FIG. 7 is a flow diagram illustrating a method of displaying previously executed, suggested database queries in natural language, for selection by a user according to an embodiment of the present disclosure.

FIG. 7 is a flow diagram illustrating a method of displaying previously executed, suggested database queries associated with a user-defined query object in natural language, for selection by a user according to an embodiment of the present disclosure. As described herein, a user of the integration application management system may model an integration process that involves migrating a data set stored within a database between two locations using a plurality of visual process elements. As also described herein, the user may choose to identify the data set to be migrated using a database query. The system for translating software queries to natural language executes code instructions via a processor, and in an embodiment may prompt the user to provide one or more parameters needed to perform such a query. In some embodiments, system for translating software queries to natural language may also provide the user with one or more previously executed database queries similar to the provided parameters, written in natural language, for potential inclusion within the database query to be implemented with a currently modeled integration process. As described herein, references made to searchable databases may include query-capable APIs working in combination with corresponding backend applications controlling or managing data sets.

At block 702, the integration application management system in an embodiment may receive a user instruction to insert a connector visual element into an integration process flow. For example, in an embodiment described with reference to FIG. 3, a user may insert a start component 302 into the process flow illustrated by the combination of the visual elements 302, 304, 306, 308, 310, and 312. The start element 302 may operate to begin a process flow, and may require user input in order for a particular enterprise or trading partner to use the resulting process. In another embodiment, the user may insert a connector element 310 at block 702, which may operate to define an action to be taken on a user-specified data set.

The integration application management system in an embodiment may receive a user instruction to perform a user-selected action on a database data set to be identified through a database query at block 704. Upon insertion of the start element 302 or a connector element 310 within the process flow in an embodiment described with reference to FIG. 3, for example, the integration application management system may prompt the user to provide data attributes unique to the user's specific integration process, such as, for example, the action the user wishes to take on a specific data set. For example, a user may choose the action "GET" in order to instruct the integration application management system to retrieve a data set. In other embodiments, the user may choose other actions, such as "POST," or "SEND." The user may provide an such an action via a graphical user interface, by, for example, manually entering the action using a keyboard or voice command, or by selecting the action from a drop-down list of available options. Other embodiments contemplate other means of user selection through methods known in the art.

A user may use a start element 302 or a connector element 310 in an embodiment to further define a location of such data, according to the language and storage structure understood by the application managing such data. A user in an embodiment may choose to identify such a data set via a database query while customizing the start element 302 or connector element 310, for example. The integration application management system in such an embodiment may then prompt the user to provide parameters necessary to complete such a database query via another graphical user interface.

At block 706, the integration application management system in an embodiment may prompt the user to provide one or more parameters necessary to perform a database query to locate data sets upon which the user-selection action may be performed, as part of the larger integration process. Such a database query may search data sets having data set field names matching the query object and retrieve data sets within that group that have data values matching the query value, for example. The integration application management system in an embodiment may prompt the user to provide a query object and query value via a graphical user interface. For example, in an embodiment described with reference to FIG. 4, the integration application management system may prompt the user, via the graphical user interface 400, to provide the query object at 404, to provide the query value at 414, to provide the a query operator, or any combination.

The system for translating software queries to natural language may receive a user-selected query object and user-selected query value in an embodiment at block 708. For example, in an embodiment described with reference to FIG. 4, a user may use the graphical user interface 400 to input a query object (e.g., "Contact") within field 404. The query object in an embodiment may define the data set field names for the data sets across which the query should be applied. For example, if a user wishes to identify data sets in which a contact or customer address does not contain the search term "Russia," the user may provide a query object "Contact/addressee," if the user knows that data sets in the database being accessed label contact or customer addresses with the data set field name "Contact/addressee." In other embodiments in which the user does not know the ways in which the database being accessed labels contact or customer addresses, the user may provide the query object "Contact." The user may also enter a query value (e.g., "Russia" 414) to indicate the term that should be included or excluded from the data set field values of matching data sets. For example, a user may provide a query object "Contact" 404, a query operator "Contains," or a query value "Russia" 414, to define a database query for data sets where the data set field value associated with a data set having the data set field name "Contact" contains the word "Russia."

At block 710, the system for translating software queries to natural language may present one or more previously executed, suggested database queries, written in natural language, associated with the user-selected query object. For example, in an embodiment described with reference to FIG. 4, the graphical user interface 400 may present a plurality of previously executed, suggested database queries within column 410, written in natural language, that are associated with the user-selected query object provided at 404. Upon the user entering the user-selected query object "Contact" 404, for example, the system for translating software queries to natural language in an embodiment may present the natural language translation "Contact addressee does not start with" of a previously executed query that involved the term "Contact" 404. In an example, a match of the entered, user-selected query object "Contact" 404 may be referenced within one or more databases of previously utilized database queries deployed for various types of databases in integration processes. Based on a determination of relevance to the user-selected query object, one or more suggested database queries previously used in other integrations may be determined and provided as suggestions for integration into a currently modeled integration process.

As described herein, upon user selection of a query object (e.g., "Contact 404), the system for translating software queries to natural language in an embodiment may retrieve one or more previously executed, suggested queries that are associated in memory with the user-selected query object. These suggested queries may be stored in memory in the query format required to access the database at which the dataset is stored, rather than in natural language. Thus, the system for translating software queries to natural language in such an embodiment may translate these suggested queries into natural language for potential inclusion within the currently modeled integration process. Each of these translated suggested queries may form a parsed clause in an embodiment. For example, in an embodiment described with reference to FIG. 5E, once the suggested queries are parsed into parsed clauses 580 in an embodiment, the system for translating software queries to natural language may present each of the parsed clauses 580 to the user for potential inclusion within the query the user wishes to perform as part of the larger integration process. For example, the system for translating software queries to natural language in an embodiment may allow the user to select to include the parsed clause "contact addressee does not start with" and "contact addressee does not contain." The user in such an example embodiment may select not to include other available parsed clauses, such as "contact country contains any of" 562 and "Campaign response base cost is greater than or equal to" 552.

The system for translating software queries to natural language in an embodiment may receive one or more user-selections of previously executed suggested database queries at block 712. For example, in an embodiment described with reference to FIG. 4, the user may select one or more of the previously executed, suggested database queries, written in natural language and presented in column 410 for inclusion within the integration process currently being modeled. The system for translating software queries to natural language in an embodiment may receive such a user-selection via the graphical user interface 400. For example, the system for translating software queries to natural language in an embodiment may receive a user-selection of the natural language query "Contact addressee does not contain," and "Contact addressee does not start with."

At block 714, the system for translating software queries to natural language in an embodiment may display the user-selected action, user-selected query object, one or more user-selections of previously executed, suggested database queries, and user-selected query value in a natural language sentence for selection by the user. For example, in an embodiment described with reference to FIG. 4, the system for translating software queries to natural language may display a natural language sentence 416 reading "get contact if contact addressee does not start with and does not contain Russia." Such a natural language sentence 416 in an embodiment may include the action selected by the user at block 704, the query object provided by the user at block 708, the previously executed, suggested database queries selected by the user at block 712, and the query value given by the user at block 708.

As described in an embodiment with reference to FIG. 5E, upon user selection of one or more parsed clauses 580 to include within the database query the user wishes to perform, the system for translating software queries into natural language may generate a natural language sentence 590 by concatenating together the action to be taken (as specified by the user while creating the start element, e.g., "GET"), the user-specified query object 510, the word "if" 594, the parsed clauses selected by the user via the graphical user interface described with reference to FIG. 4 (e.g., parsed clause 574), and the query value "Russia" 599. The graphical user interface 400 and the system for translating a software query to natural language in embodiments described herein may allow a user not familiar with query languages to understand what a given query will likely return in the deployed integration process currently being modeled and set up.

Figure 8:
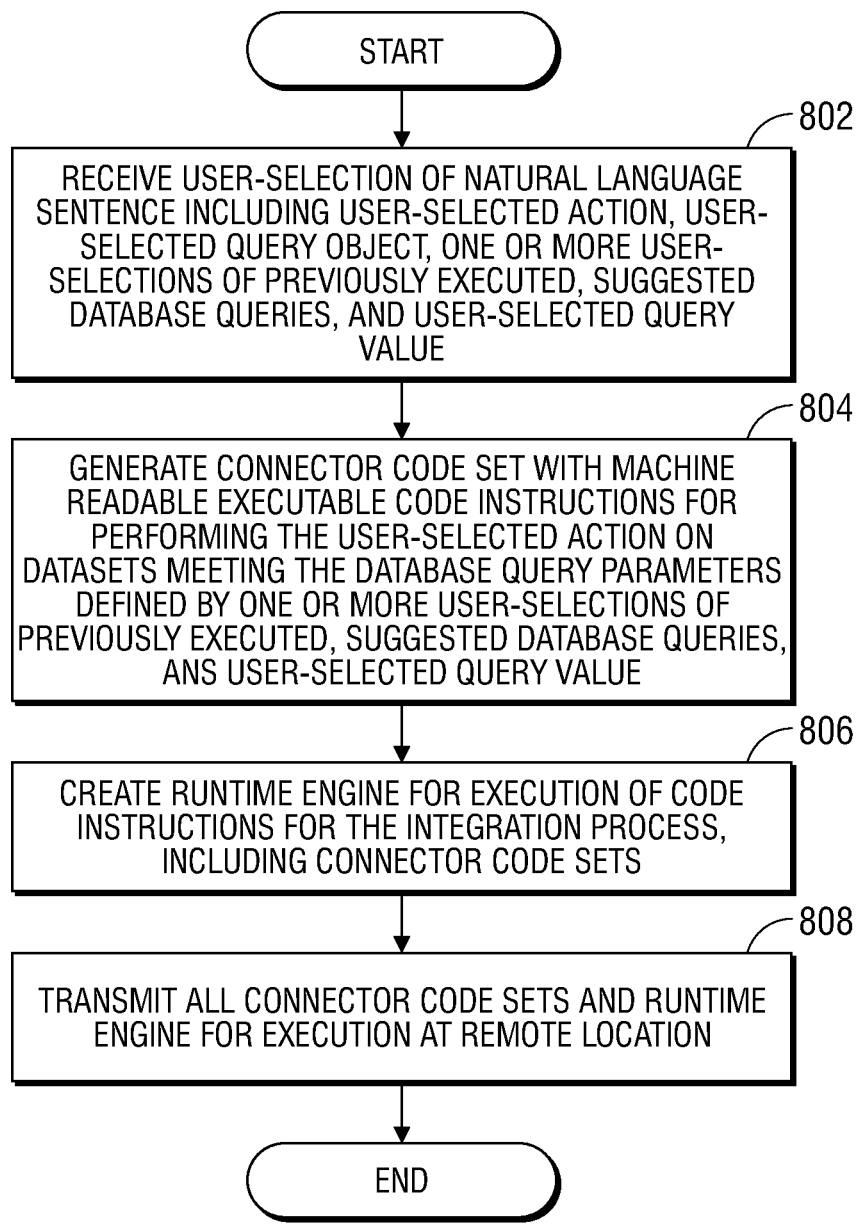
FIG. 8 is a flow diagram illustrating a method of generating code sets for migrating data sets meeting a natural language, user-selected software query according to an embodiment of the present disclosure.

FIG. 8 is a flow diagram illustrating a method of generating and transmitting code sets of an integration process for migrating data sets meeting a user-selected software query represented by a natural language sentence according to an embodiment of the present disclosure. As described herein, a user of the integration application management system executes code instructions via a processor to model an integration process that involves setting up migration of a data set stored within a database between two locations using a plurality of visual process elements. As also described herein, the user may choose to identify the data set to be migrated using a database query.

At block 802, the integration application management system in an embodiment may receive a user-selection of a natural language sentence including a user-selected action, user-selected query object, one or more user-selections of previously executed, suggested database queries, and a user-selected query value. For example, in an embodiment described with reference to FIG. 4, the user may select to include the suggested query represented by the natural language sentence 416 "get contact if contact addressee does not start with and does not contain Russia." As described in an embodiment with reference to FIG. 7, such a natural language sentence may include the action selected by the user at block 704, the query object provided by the user at block 708, the previously executed, suggested database queries selected by the user at block 712, and the query value given by the user at block 708. As described herein, references made to searchable databases may include query-capable APIs working in combination with corresponding backend applications controlling or managing data sets.

The integration application management system in an embodiment may generate a connector code set with machine readable executable code instructions for performing the user-selected action on the datasets meeting the database query parameters defined by the one or more user-selections of previously executed, suggested database queries, and the user-selected query value at block 804. As described herein, the natural language sentence selected for inclusion in the currently modeled integration process by the user at block 802 may include one or more user-selected natural language translations of previously executed database queries. Upon selection of the natural language sentence by the user, the system for translating software queries to natural language in an embodiment may transmit an identification of the previously executed software queries that were translated to form the natural language sentence selected by the user at block 802. Each of these previously executed queries may be stored in memory accessible by the integration application management system in the proper syntax required to access the data sets being queried.

The integration application management system in an embodiment may access these stored previously executed queries, written in the proper query syntax, and automatically insert them within a connector code set of the larger integration process. For example, the integration application management system may generate the XML code set:

```
<action> get </action>
SELECT      Contact/addressee
FROM        ERPPlatform.contacts
WHERE       Contact/addressee DoesNotStartWith 'Russia'
AND         Contact/addressee DoesNotContain 'Russia'
```

At block 806, the integration application management system in an embodiment may create a runtime engine for execution of the code instructions for the integration process, including the connector code sets. The integration application management system operating at least partially at a system provider server/system in an embodiment may generate a dynamic runtime engine for executing these pre-defined subsets of code instructions correlated to each individual process-representing visual element (process component) in a given flow diagram in the order in which they are modeled in the given flow diagram.

The integration application management system in an embodiment may transmit the connector code sets and runtime engine for execution at a remote location at block 808. For example, in an embodiment described with reference to FIG. 2, the system for translating a software or database query into natural language, operating at a service provider server/system 212 may transmit the connector code sets, including machine-executable code instructions for performing a software query, to the enterprise system/network 214 for execution of those software or database queries at the business process system 204. Execution of the above code set in such a manner in an embodiment may return a data set stored at the location "ERPPlatform.contacts" having a field name "Contact/addressee" and a field value "John_Smith_123_Main_St_Austin_TX_USA" because the data set field value associated with the data set field name "Contact/addressee" does not contain the word "Russia." The method may then end.

Figure 9:
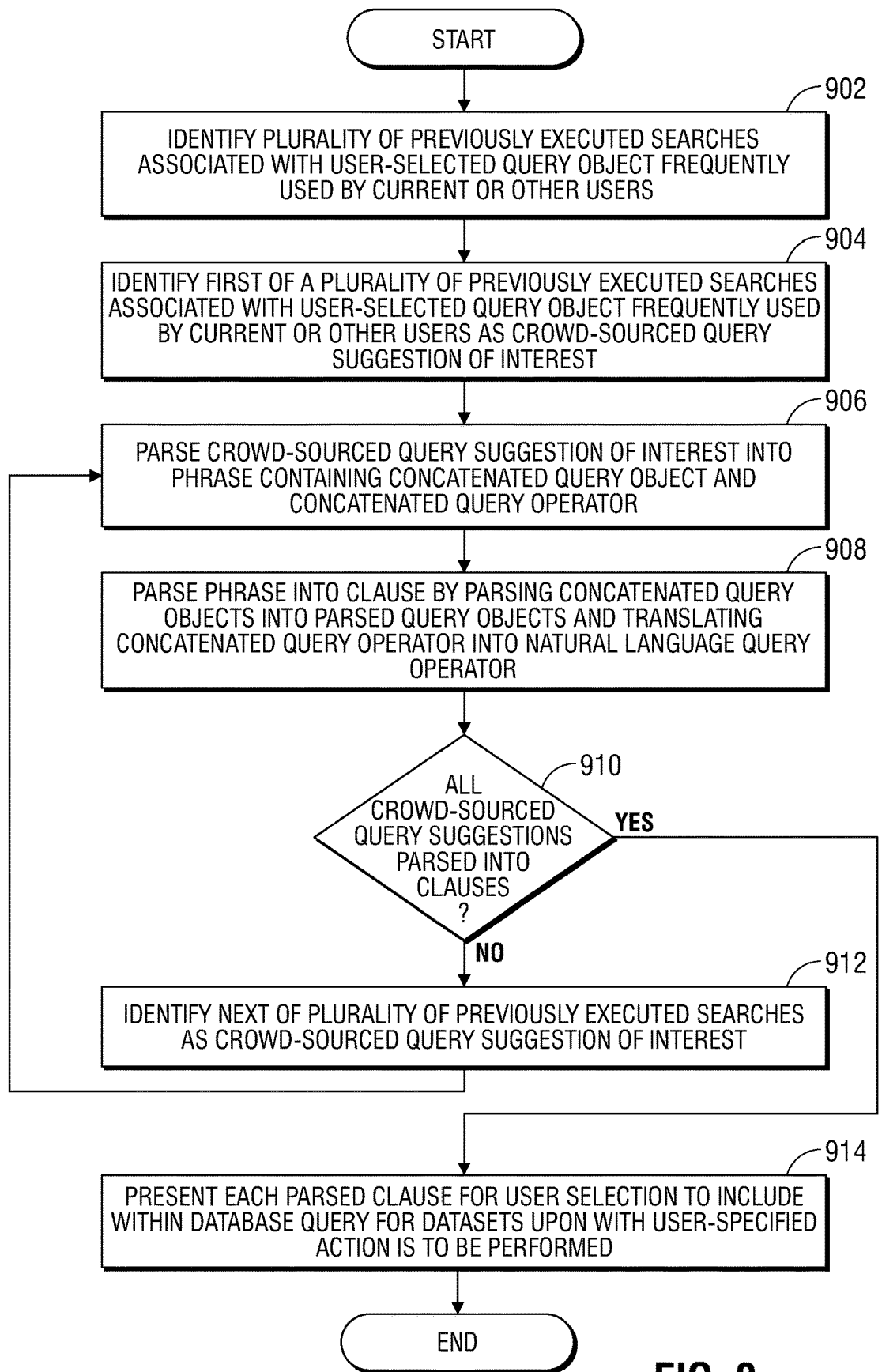
FIG. 9 is a flow diagram illustrating a method of translating suggested searches into natural language for user-selection according to an embodiment of the present disclosure.

FIG. 9 is a flow diagram illustrating a method of translating suggested queries into natural language for potential user-selection to include within a currently modeled integration process according to an embodiment of the present disclosure. As described herein, the system for translating software queries to natural language executes code instructions on a processor and in an embodiment may identify one or more previously executed queries associated with a user-selected query object, and frequently used by current or other users into natural language. A graphical user interface in an embodiment may receive a user input indicating a query field name a user wishes to search for, and in return, supply the user with one or more queries on the same query field name previously executed by the same user or other users. This is done, for example, by a suggestion engine or filter suggestion system matching a user-selected query object with one or more previously executed database or software queries for integrations to yield suggested queries for the presently modeled integration process development. Each of these suggested queries may be presented to the user in natural language, allowing the user to understand the scope of such queries without needing to learn specific syntaxes or languages in which those queries were previously executed.

At block 902, the system for translating software queries to natural language executing code instructions in an embodiment may identify a plurality of previously executed queries associated with the user-selected query object frequently used by current or other users. For example, in an embodiment described with reference to FIG. 5B, a user may input a user-specified query object "Contact" 512 into a graphical user input, and the previous software queries "Contact/address doesNotStartWith?" 530, "Contact/addressee doesNotContain?" 540, "campaignResponse/baseCost greaterThanOrEqualTo?" 550, and "Contact/country anyOf?" 560 associated in memory with the user-specified query object "Contact" 512 may be identified. These previously executed queries 520 (e.g., 530, 540, 550, and 560) may be associated in memory with the user-specified query object 510 (e.g., 512) in some embodiments based on crowd-sourced information indicating a likelihood that a user querying the user-specified query object 510 may benefit from execution of these previously executed queries. As described herein, crowd-sourced information in such an embodiment may include metadata associated with a plurality of customers or users of the system for translating a software query into natural language and may describe any information input via user interfaces described herein, and various logging information describing interaction or behaviors between users and such interfaces, deployments of modeled integration process flows, and executions of modeled integration process flows. The association may be conducted in one or more remote databases containing previously executed queries 520 for previous integration process setups via a suggestion engine or a filter suggestion system. As described herein, references made to searchable databases may include query-capable APIs working in combination with corresponding backend applications controlling or managing data sets.

The system for translating software queries to natural language in an embodiment may identify a first of the plurality of previously executed queries associated with the user-selected query object frequently used by current or other users as the crowd-sourced query suggestion of interest at block 904. For example, in an embodiment described with reference to FIG. 6A, the system for translating software queries to natural language may select the crowd-source based query suggestion 630 "Contact/address doesNotStartWith?" as the crowd-sourced query suggestion of interest.

At block 906, the system for translating software queries to natural language in an embodiment may parse the crowd-sourced query suggestion of interest into a phrase containing a concatenated query object and a concatenated query operator. The crowd-sourced query suggestion of interest in an embodiment may include a concatenated query object, and a concatenated query operator. For example, a query suggestion in an embodiment may include a concatenated query object "Contact/addressee," and a concatenated query operator "doesNotContain." Each of these parameters in an embodiment may be given in the proper syntax required for queries to the database in control of data sets being queried, which may require concatenation of multiple natural language words into a single concatenated query object, or concatenated query operator. For example, the concatenated query object "Contact/addressee" may concatenate or combine the natural language words "Contact" and "addressee" into the single, concatenated query object "Contact/addressee," and the concatenated query operator "doesNotContain" may concatenate or combine the natural language words "does," "not," and "contain."

The system for translating a software query to natural language in an embodiment may parse such database queries into phrases by identifying and separating concatenated query objects from concatenated query operators. For example, in an embodiment described with reference to FIG. 6A, the system for translating a software query to natural language may parse a query "Contact/addressee doesNot- StartWith?" 630 into a phrase 671 including concatenated query objects "Contact/addressee" 672 and concatenated query operator "doesNotStartWith" 673.

The system for translating software queries to natural language in an embodiment may parse the phrase into a parsed clause by parsing the concatenated query objects into parsed query objects and translating the concatenated query operator into natural language at block 908. Upon parsing a database or software query into a phrase, the parsed phrase may be further parsed into clauses. As described herein, a parsed phrase may contain a concatenated query object and a concatenated query operator. For example, in an embodiment described with reference to FIG. 6B, phrase 671 may include the concatenated query object "Contact/addressee" 671 and the concatenated query operator "doesNotStartWith" 673.

The parsed phrases 670 in an embodiment may be further parsed into clauses 680 by identifying and separating concatenated query objects within a phrase 670 into separate, parsed query objects. For example, the system for translating software queries to natural language in an embodiment may parse the phrase 671 into clause 632 by separating the concatenated query object "Contact/addressee" 672 into the separate, parsed query objects "Contact" 633 and "Addressee" 634. Further, a clause may translate a concatenated query operator, written in compatible database syntax into a natural language query operator. For example, the system for translating software queries to natural language in an embodiment may translate the concatenated query operator "doesNotStartWith" 673 in phrase 671 into the natural language query operator "Does Not Start With" 635 of clause 632. After separating parsed query objects from one another and translating concatenated query operators into natural language query operators, the system for translating a software query into natural language may combine each of the parsed query objects and at least one natural language query operator into a single, parsed clause in an embodiment. For example, the system for translating a software query into natural language in an embodiment may combine the parsed query object "Contact" 633, the parsed query object "addressee" 634, and the natural language query operator "does not start with" 635 into a single parsed clause 635.

At decision block 910, the system for translating software queries into natural language in an embodiment may determine whether all crowd-sourced query suggestions have been parsed into clauses. For example, in an embodiment described with reference to FIG. 6A, the system for translating software queries into natural language in an embodiment may determine whether each of the crowd-sourced query suggestions 630, 640, and 660 have been parsed into clauses. If each of the crowd-sourced query suggestions has been parsed into clauses in an embodiment, the method may proceed to block 914 for presentation of each of the parsed clauses for potential user selection to include within a currently modeled integration process. If each of the crowd-sourced query suggestions has not been parsed into clauses in an embodiment, the method may proceed to block 912 for selection of the next crowd-sourced query suggestion of interest.

The system for translating software queries to natural language in an embodiment may identify the next of the plurality of previously executed queries as the crowd-sourced query suggestion of interest at block 912. For example, in an embodiment described with reference to FIG. 6A, the crowd-sourced query suggestion 630 may have been parsed into clauses, while the crowd-sourced query suggestions 640 and 660 have not. In such an embodiment, the system for translating software queries to natural language may select the crowd-sourced query suggestion 640 as the crowd-sourced query suggestion of interest, and the method may proceed back to block 906 for parsing of the crowd-sourced query suggestion 640 into clauses. By repeating the loop between blocks 906 and 912, the system for translating software queries to natural language in an embodiment may parse each of the crowd-sourced query suggestions from the syntax required to execute such queries into natural language clauses more easily understood by the user.

At block 914, in an embodiment in which each of the crowd-sourced query suggestions have been parsed into natural language clauses more easily understood by the user, the system for translating software queries into natural language may present each of the parsed clauses to the user for selection to include within the database query for data sets upon which the user-specified action is to be performed. For example, in an embodiment described with reference to FIG. 4, the system for translating software queries into natural language may present each of the parsed clauses within column 410. The user of the graphical user interface 400 in such an embodiment may select one or more of these parsed clauses, written in natural language, for inclusion within a larger integration process. For example, in an embodiment described with reference to FIG. 3, selection of one or more of these suggested queries may dictate which data sets are accessed, migrated, or otherwise manipulated in a portion of an integration process modeled by a start element 302 or a connector element 310. Such a start element 302 or a connector element 310 may further define a user-selected action to be performed on that data set. By presenting the parsed clauses for user selection in an embodiment, the system for translating software queries into natural language may present previously executed queries that may prove useful within the currently modeled integration process, written in natural language more easily understood by the user. The method may then end.

Figure 10:
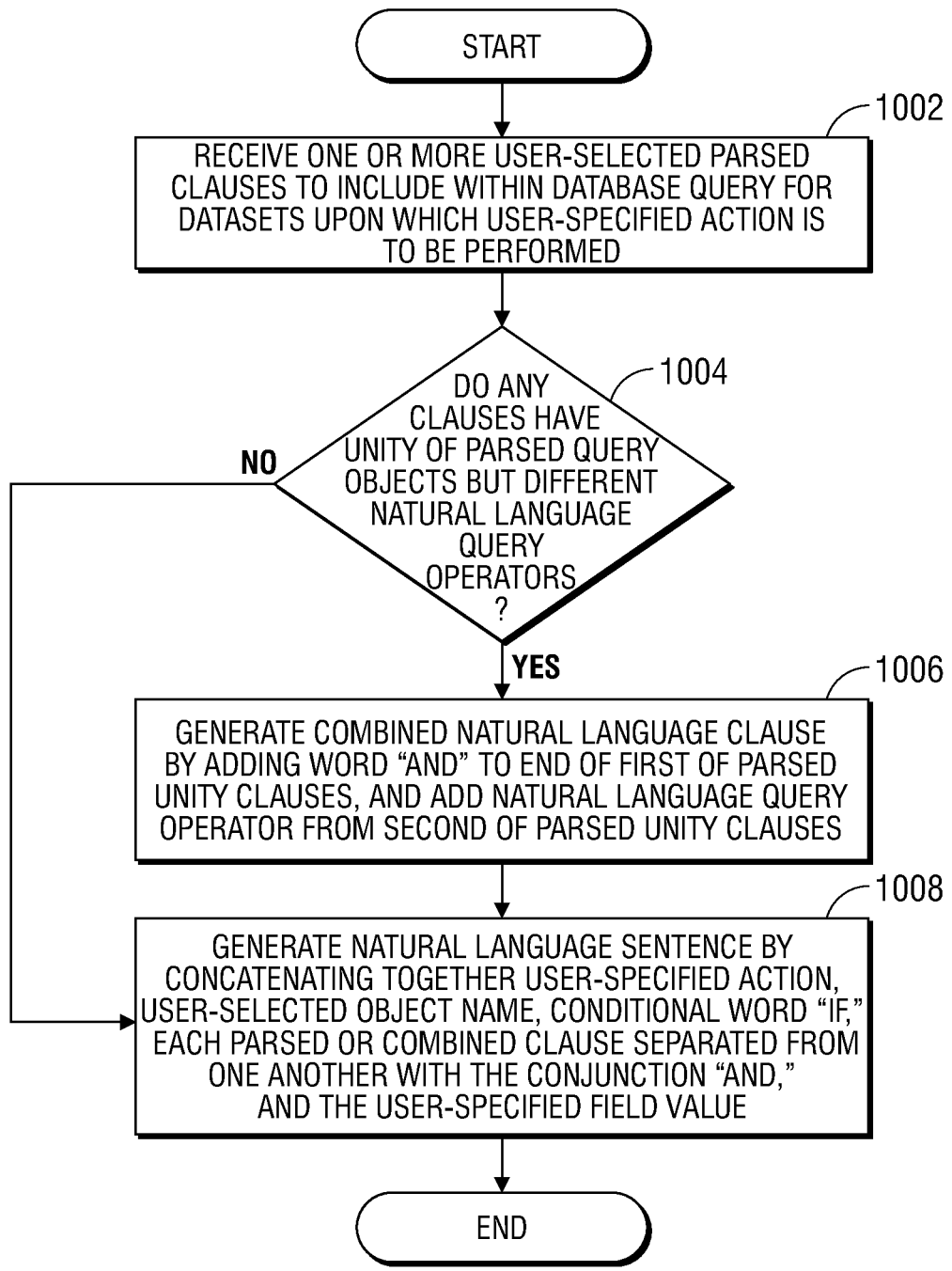
FIG. 10 is a flow diagram illustrating a method of generating a natural language sentence including previously executed, suggested database queries according to an embodiment of the present disclosure.

FIG. 10 is a flow diagram illustrating a method of generating a natural language sentence describing command instructions including one or more previously executed, suggested database queries associated with a user-defined query object according to an embodiment of the present disclosure. The system for translating a software query to natural language in an embodiment may generate a natural language sentence representing the action a connector element illustrated in FIG. 3 is customized to take on a data set matching the suggested crowd-source based query, for user approval or selection. For example, a start element 302 in FIG. 3 may be customized in an embodiment to retrieve data sets for varied databases matching the user-selected query parameters by selecting the action "get" and selecting to identify the dataset to be retrieved using a database query during the currently modeled integration. In such an embodiment, the system for translating a software query to natural language may then prompt the user to define the query parameters via the graphical user interface described with reference to FIG. 4. The user may then enter a query object (e.g., "contact"), and the system for translating software queries to natural language may retrieve previously executed, suggested queries that are associated in memory with the entered query object (e.g., "contact").

Returning to FIG. 10, at block 1002, the system executing conde instructions on a processor for translating software queries into natural language in an embodiment may receive one or more user-selected parsed clauses to include within the database query for data sets upon which the user-specified action is to be performed. As described herein, once the suggested queries are parsed into parsed clauses in an embodiment, the system for translating software queries to natural language may present each of the parsed clauses to the user for potential inclusion within the query the user wishes to perform as part of the larger integration process. For example, the system for translating software queries to natural language in an embodiment described with reference to FIG. 4 may allow the user to select to include the parsed clause "contact addressee does not start with" and "contact addressee does not contain." The user in such an example embodiment may choose not to include other available parsed clauses, such as, for example, "contact country contains any of" and "Campaign response base cost is greater than or equal to."

At decision block 1004, the system for translating software queries to natural language in an embodiment may determine whether any of the user-selected clauses have unit of parsed query objects but differing natural language query operators. For example, in an embodiment described with reference to FIG. 5D, in which a user has selected the suggested queries "Contact/addressee doesNotContain" and "Contact/addressee doesNotStartWith," the natural language clause 532 may include the verb (e.g., parsed query operator) "does not start with" 535 acting on the nouns (e.g., parsed query objects) "Contact" 533 and "Addressee" 534, and the natural language clause 542 may include the verb "does not contain" 545 acting on the same nouns "Contact" 543 and "Addressee" 544. In such an embodiment, the natural language clauses 532 and 542 may contain a unity of parsed query objects (e.g., "Contact" and "Addressee"), but differing natural language query operators (e.g., "does not start with" vs. "does not contain").

In contrast, in an embodiment described with reference to FIG. 6B, the parsed clauses 632 and 646 may not have unity of parsed query objects, although they each share a single parsed query object. More specifically, the parsed clause 632 and the parsed clause 646 may both include the parsed query object "contact," but the parsed clause 632 may also include the parsed query object "addressee," which may not be included in the parsed clause 646, and the parsed clause 646 may also include the parsed query object "country," which may not be included in the parsed clause 632. Thus, no unity of parsed query objects may exist between parsed clauses 632 and 646 in such an embodiment. If multiple parsed clauses contain a unity of parsed query objects, the method may proceed to block 1006 for combination of those clauses into a single parsed clause. If no two parsed clauses contain a unity of parsed query objects, the method may proceed to block 1008 for generation of a natural language sentence containing the multiple parsed clauses.

At block 1006, in an embodiment in which two or more parsed clauses share a unity of parsed query objects, but differing natural language query operators, the system for translating a software query into natural language may generate a combined natural language clause by adding the word "and" to the end of the first parsed unity clause, and add the natural language query operator from the second of the unity clauses after the word "and." For example, in an embodiment described with reference to FIG. 5D, the separate parsed clauses 532 and 542 may be combined into a single natural language clause 574 reading "Contact addressee does not contain and does not start with." This may be achieved by concatenating together the parsed query objects that are identical in both clauses 532 and 542 (e.g., "contact" and "addressee"), and each of the natural language query operators 535 and 545, with the operators separated by a conjunction (e.g., "and").

At block 1008, the system for translating software queries into natural language in an embodiment may generate a natural language sentence by concatenating together the user-specified action, the user-selected object name, the conditional word "if," each parsed or combined clause separated from one another with the conjunction "and," and the user-specified field value. Upon user selection of one or more parsed or combined natural language clauses to include within the database query the user wishes to perform, the system for translating software queries into natural language may generate a natural language sentence. For example, the system for translating a software query into a natural language sentence may do so in an embodiment described with reference to FIG. 5E by concatenating together the action to be taken (as specified by the user while creating the start element, e.g., "GET"), the user-specified query object 510, the word "if" 594, the parsed clauses selected by the user via the graphical user interface described with reference to FIG. 4 (e.g., parsed clause 574), and the query value "Russia" 599 given by the user via the graphical user interface described with reference to FIG. 4. The resulting natural language sentence 590 in such an embodiment may then read "Get contact if contact and addressee does not contain and does not start with Russia." By translating syntax specific queries (e.g., 520) into natural language sentences 590 in such a way, the graphical user interface and the system for translating a software query to natural language in embodiments described herein may allow a user not familiar with query languages to understand what a given query will likely return. The method may then end.

The blocks of the flow diagrams 7-10 discussed above need not be performed in any given or specified order and may be executed as code instructions at one or a plurality of processors during preparation and set up of a modeled integration process or of a deployed integration process as described herein. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a system for translating software queries into natural language comprising:
   a processor executing code instructions of an integration application management system to set a portion of a currently modeled integration process to identify a data set stored at a remote database through a database query and to perform a user-selected action on the data set;
   a graphical user interface receiving a user-selected query object and user-selected query value defining parameters of the database query;
   the processor retrieving a suggested database query drawn from previously executed database queries based on the received user selected query object;
   the processor translating, via execution of code for a natural language generator system, the suggested database query associated with the user-selected query object to a natural language translation of the suggested database query;
   the graphical user interface displaying the natural language translation of the suggested database query for selection by a user instruction to include the selected, suggested database query in the currently modeled integration process;
   the processor automatically generating a connector code set of machine readable and executable code instructions for performing the user-selected action on data sets stored at the remote database meeting the selected, suggested database query and the user-selected query value; and
   a network interface device transmitting the connector code set and a runtime engine for execution of the connector code set at a remote location in deployment of the currently modeled integration process.

2. The information handling system of claim 1 further comprising:
   the graphical user interface presenting a natural language sentence describing performance of the user-selected action if a data set stored at the remote database meets the suggested database query; and
   the graphical user interface receiving a user selection of the natural language sentence indicating the selected, suggested database query.

3. The information handling system of claim 1, wherein the suggested database query comprises a concatenated query object and a concatenated query operator, further comprising:
   the processor translating the suggested database query by parsing the suggested database query into one or more phrases that each comprise a concatenated query object and a concatenated query operator; and
   the processor parsing the one or more phrases into a plurality of parsed clauses that each comprise a parsed query object and a natural language query operator.

4. The information handling system of claim 3, wherein a first of the plurality of parsed clauses comprises a first parsed query object beginning with a capital letter, a second of the plurality of parsed clauses comprises a second parsed query object beginning with a capital letter, and one of the one or more phrases comprises a concatenation of the first parsed query object and the second parsed query object.

5. The information handling system of claim 3, wherein the concatenated query object comprises a plurality of concatenated query objects separated by a slash.

6. The information handling system of claim 3 further comprising:
   the processor determining a plurality of suggested database queries is selected and that each of the parsed query objects of the plurality of suggested database queries matches;
   the processor generating a combined parsed query object clause by adding the conjunction "and" to the natural language query operators of the plurality of suggested database queries; and
   wherein the combined clause forms the natural language translation of the multiple selected, suggested database queries.

7. The information handling system of claim 1, wherein the suggested database query is identified as relevant to the database query of the currently modeled integration process based on crowd-sourced histories of previously executed integration processes involving the user-defined query object.

8. A method of translating software queries into natural language comprising:
   setting, via a processor executing code instructions of an integration application management system, a portion of a currently modeled integration process to identify a data set stored at a remote database through a database query and to perform a user-selected action on the data set
   receiving, via a graphical user interface, a user-selected query object and user-selected query value defining parameters of the database query;
   retrieving a plurality of suggested database queries drawn from previously executed database queries based on the received user selected query object;
   translating the plurality of suggested database queries associated in memory with the user-selected query object to a natural language translation of the plurality of suggested database queries for display via the graphical user interface;
   receiving a user instruction selecting at least one suggested database query for inclusion in the currently modeled integration process;
   automatically generating, via the processor, a connector code set of machine readable and executable code instructions for performing the user-selected action on data sets stored at the remote database meeting the selected, at least one suggested database query and the user-selected query value; and
   transmitting the connector code set and a runtime engine for execution of the connector code set at a remote location via a network interface device upon deployment of the currently modeled integration process.

9. The method of claim 8 further comprising:
   presenting a natural language sentence, via the graphical user interface, describing performance of the user-selected action on the user-selected query object if a data set stored at the remote database meets the selected, at least one suggested database query; and
   receiving a user selection of the natural language sentence.

10. The method of claim 8, wherein the previously executed, suggested database query comprises a concatenated query object and a concatenated query operator, further comprising:

translating the plurality of suggested database queries by parsing, via the processor, each suggested database query into one or more phrases that each comprise a concatenated query object and a concatenated query operator; and parsing the one or more phrases into a plurality of parsed clauses that each comprise a parsed query object and a natural language query operator.

11. The method of claim 10 further comprising:

determining, via the processor, that more than one of the plurality of suggested database queries is selected and determining if plurality of parsed clauses for the parsed query object matches;

generating a combined clause by adding the natural language query operators separated by the conjunction "and" for the more than one of the plurality of selected, suggested database queries for a natural language translation of the more than one selected, suggested database queries.

12. The method of claim 10, wherein the concatenated query object comprises a plurality of concatenated query objects separated by a period.

13. The method of claim 10, wherein the concatenated query object comprises a plurality of concatenated query objects separated by an underscore.

14. The method of claim 8, wherein the plurality of suggested database queries are identified as potentially relevant to the database query and retrieved based on crowd-sourced histories of previously executed integration processes involving the user-defined query object.

15. An information handling system operating a system for translating software queries into natural language comprising:

a processor executing code instructions of an integration application management system to set a portion of a currently modeled integration process to identify a data set stored at a remote database through a database query and to perform a user-selected action on the data set;

a graphical user interface receiving a user-selected query object and user-selected query value defining parameters of the database query;

the processor retrieving a plurality of suggested database queries identified as relevant to the database query of the currently modeled integration process based on crowd-sourced histories of previously executed integration processes involving the user-defined query object;

the processor translating, via execution of code for a natural language generator system, the plurality of suggested database queries associated with the user-selected query object to a natural language translation of the plurality of suggested database queries for display via the graphical user interface;

selection by a user instruction to include at least one suggested database query as a selected, suggest database query in the currently modeled integration process;

the processor automatically generating a connector code set of machine readable and executable code instructions for performing the user-selected action on data sets stored at the remote database meeting the selected, suggested database query and the user-selected query value; and a network interface device transmitting the connector code set and a runtime engine for execution of the connector code set at a remote location in deployment of the currently modeled integration process.

16. The information handling system of claim 15, wherein the suggested database queries comprise a concatenated query object and a concatenated query operator, further comprising:

the processor translating the plurality of suggested database queries by parsing the suggested database queries into one or more phrases that each comprise a concatenated query object and a concatenated query operator.

17. The information handling system of claim 16, wherein the concatenated query object is separated from the concatenated query operator by a space.

18. The information handling system of claim 16, wherein the concatenated query object comprises a plurality of concatenated query objects separated by a dash.

19. The information handling system of claim 16, further comprising:

parsing the one or more phrases into one or more parsed clauses that each comprise a parsed query object and a natural language query operator, where the one or more parsed clauses form the natural language translation of the selected, suggested database query.

20. The information handling system of claim 15, further comprising:

selection to include more than one suggested database query as selected, suggest database queries in the currently modeled integration process; and translating, via execution of code for the natural language generator system, the more than one selected, suggested database queries associated with the user-selected query object to a combined natural language translation of the more than one selected, suggested database queries by matching parsed query objects for display via the graphical user interface.

* * * * *